(12) United States Patent
Hamada

(10) Patent No.: US 6,549,730 B1
(45) Date of Patent: Apr. 15, 2003

(54) FOCAL POSITION CHANGEABLE SPATIAL MODULATION UNIT AND FOCUS DETECTION DEVICE

(75) Inventor: Masataka Hamada, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/671,629

(22) Filed: Sep. 28, 2000

(30) Foreign Application Priority Data

Sep. 29, 1999 (JP) .......................... 11-276442

(51) Int. Cl.[7] .................. G02B 7/28; G02B 26/00; G03B 13/00
(52) U.S. Cl. .................. 396/111; 359/290; 359/291
(58) Field of Search .................. 396/111–117, 124; 359/290, 291, 319

(56) References Cited

U.S. PATENT DOCUMENTS 4,916,473 A * 4/1990 Mukai et al. ............... 396/114
5,669,022 A * 9/1997 Kadohara et al. ........... 396/111

OTHER PUBLICATIONS

Satoh, S., "Liquid Crystal Microlens". O Pluse E, Oct. 1998, Col. 20, No. 10, pps. 1118–1124.*

* cited by examiner

Primary Examiner—Russell Adams
Assistant Examiner—Arthur A Smith
(74) Attorney, Agent, or Firm—Burns, Doane, Swecker & Mathis, LLP

(57) ABSTRACT

A spatial modulator, a luminous flux deflector, a focus detection apparatus and a imaging device, which are capable of changing the focal position. The focus detection device includes: a focus sensor; liquid crystal cells that are arranged between a lens and the focus sensor and deflect luminous flux guided from the lens to the focus sensor while enabling a deflection characteristic of the luminous flux guided from the lens to the focus sensor to be changed; and a microcomputer for controlling the liquid crystal cells according to the size, position and so on upon an exit pupil of the lens and changing the deflection characteristic of the luminous flux guided from the lens to the focus sensor.

21 Claims, 21 Drawing Sheets

Fig.11A
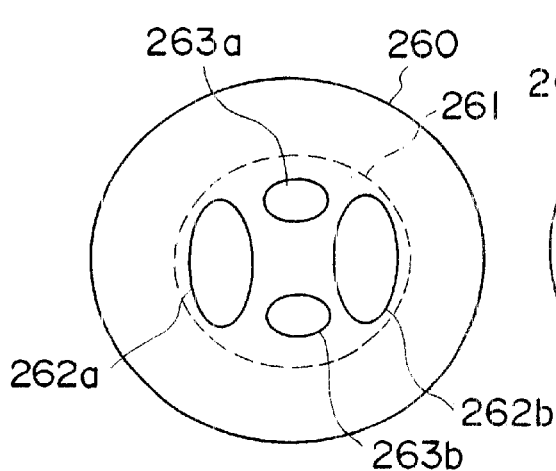
Fig.11B
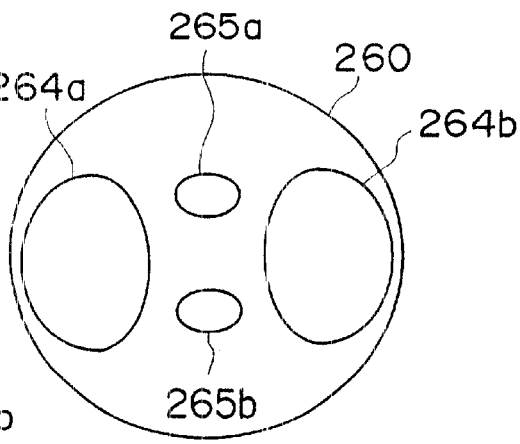
Fig.11C
Fig.11D
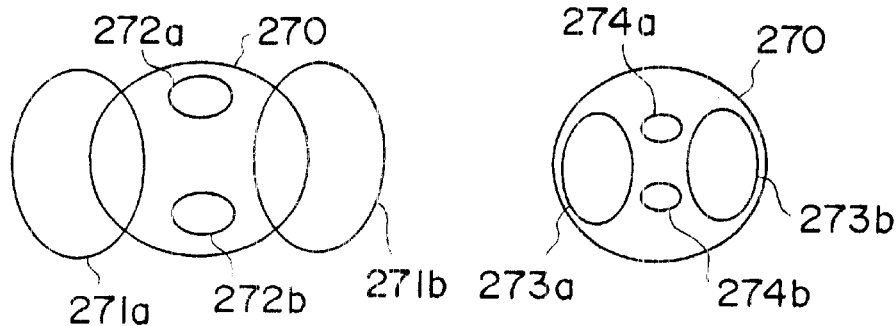
Fig.12
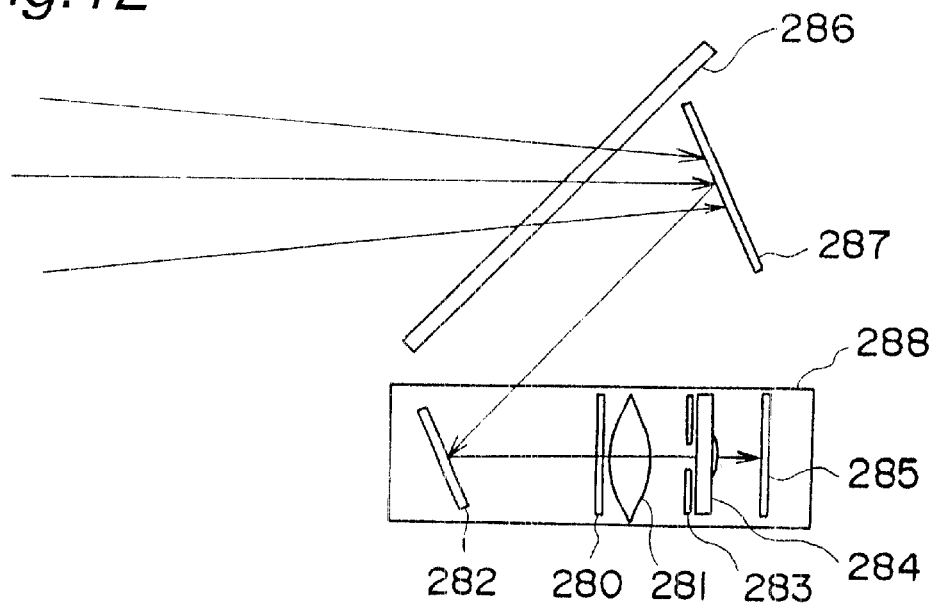

FOCAL POSITION CHANGEABLE SPATIAL MODULATION UNIT AND FOCUS DETECTION DEVICE

This application is based upon application No. 11-276442 filed in Japan, the contents of which are hereby incorporated by reference.

BACKGROUND OF THE INVENTION

1. Field of the Invention

The present invention relates to a spatial modulation unit, a luminous flux deflection device, a focus detection device, a camera and a focus control device, which are capable of changing the focal position.

2. Description of the Related Arts

Conventionally, there have been known a plastic mold Fresnel plate, a photographic dry plate type diffraction grating, a glass plate marking-off type diffraction grating, a photographic dry plate type hologram and a photoresist type hologram, in each of which the transmission or reflection optical path is fixed in the manufacturing stage.

As a technique for deflecting the transmission or reflection optical path, there are, for example, the following techniques.

In Japanese Non-examined Laid-open Patent Publication No. 10-62609, there is disclosed a microlens capable of adjusting the focal position. The microlens is constituted by a single lens by itself, can change the focal position thereof and is applicable only to a lens with a small-diameter pupil. If the microlens is simply increased in dimension, then the necessary spherical surface (aspherical surface) cannot be obtained, meaning that the practicality is presumably difficult. The disclosed microlens is intended to constitute an image-forming optical system of an imaging device and has neither effect nor construction for preventing the pupil shading caused by the imaging lens.

In Japanese Non-examined Laid-open Patent Publication No. 9-184965, there is disclosed a technique for providing the deflector for deflecting the incident optical path with a power. However, the lens power is not changed, and the pupil of the imaging lens cannot be effectively used.

Also, a technique capable of forming a microlens array and changing the focal position has been known. However, only a lens having a diameter of several tens to several hundreds of micrometers can be formed.

For example, FIGS. 18 and 19 show a conventional liquid crystal cell. There are proposed a prism element capable of varying the deflection angle and a lens capable of varying the focal position, by using liquid crystals that exhibit an anisotropic electrooptical characteristics. Namely, the molecular alignment state of liquid crystals are controlled.

FIG. 18 is a view of a liquid crystal cell constructed of nematic liquid crystals 401. The reference numerals 410 and 411 denote circular hole pattern electrodes, across which a voltage V is applied. An equipotential surface in this case is indicated by the wavy lines in FIG. 18.

Then, a plurality of cells of FIG. 18 are assembled to form the structure of FIG. 19. The structure includes a liquid crystal layer 401 for generating a refraction power, alignment films 404 and 405 and glass substrates 402 and 403. The reason why the alignment films are coated is to align the liquid crystal molecules in one direction by performing a rubbing process. Holes 410a and 411a of the circular hole pattern electrodes 410 and 411 become the respective lenses.

If a voltage not lower than the threshold value is applied to the liquid crystal cell, then there is obtained a liquid crystal alignment state determined depending on the alignment regulation force of the substrate, the elasticity force of the liquid crystals and the alignment force caused by the electric field. This state is shown in FIG. 18. The inclination of alignment varies depending on the distance from each electrode. The refractive index is small near the electrodes, and the refractive index is great at the center of the circular hole. With this arrangement, a characteristic similar to that of a convex lens can be obtained.

Conventionally, one cell has a diameter size of 300 $\mu$m and a liquid crystal thickness of 100 $\mu$m, and the application voltage has about 1 to 5 V. The effective region has a very small region and is intended, for example, for condensing the laser light beam to about 2 $\mu$m. Namely, it is impossible to use the effective region in a size that can be expressed on the order of millimeters.

Also, a diffraction grating capable of changing the optical path is known. However, this is not constructed by itself so as to have a focal position.

Also, a display device whose optical path is changed by a micro-mirror is known. This device is intended to spread a point light source into a wide range for display and is not constructed only by itself so as to obtain a focus. If it is tried to obtain a focus by this device, then unevenness will presumably result in since the arrangement is a square arrangement.

With regard to an incident luminous flux deflecting device to be utilized for a sensing device for sensing the focus of an optical device or the like, the following techniques have conventionally been known.

For example, in Japanese Non-examined Laid-open Patent Publication No. 10-62681, there is disclosed a technique for varying a shielding means by the open f value of the imaging lens inside the sensing unit. However, the lens power is not changed, and the position of the shielding portion moves (baseline length is varied) to disadvantageously change the sensing accuracy.

In Japanese Non-examined Laid-open Patent Publication No. 58-78101, there is disclosed a technique for setting the power of the field lens arranged in the vicinity of the focal plane of the imaging lens so that the image of the image-forming lens falls within the exit pupil. However, there is achieved no change according to the pupil position and diameter of the imaging lens.

In Japanese Non-examined Laid-open Utility Model Publication No. 55-155223, there is disclosed a technique for changing a shielding means symmetrical about the optical axis inside the sensing unit according to the mounting/dismounting of the focalplane plate. However, the lens power is not changed, and the shielding portion is moved. Furthermore, the necessary quantity of light cannot be obtained.

As described above, in the Japanese Non-examined Laid-open Patent Publication No. 9-184965, there is disclosed a technique for providing a deflection means for deflecting the incident optical path with a power. However, the lens power is not changed, and the pupil of the imaging lens cannot be effectively used.

When executing a sensing operation for the purpose of imaging and measurement by utilizing the luminous flux from the subject, which has been incident on the object lens and passed through the pupil of the object lens, in general, the luminous flux should preferably be utilized within the full span of the exit pupil of the lens taking the sensing range (area) and accuracy into consideration.

However, when executing a focus detecting operation by means of, for example, a camera, then the position and size of the exit pupil differs depending on the type of the imaging lens, or the object lens, and the pupil position and size are changed by focusing and zooming even with an identical imaging lens. Conventionally, the optical path is fixed, and therefore, the optical path is designed according to the type of the imaging lens and the possible minimum size of the exit pupil when focusing or zooming operation is executed. Based upon the above reasons, there have been limitations on an improvement in accuracy and on the widening of the focus area using an area sensor.

Namely, with regard to the focus detection accuracy, a higher accuracy can be obtained when a wider exit pupil region is used. The accuracy is determined depending on the distance between the two rays of luminous flux that form the two subject images from the optical axis of the imaging lens. The greater the distance between the rays of luminous flux in the exit pupil position, the higher the accuracy is. If the focus detection area is set wide, then the center of the luminous flux comes closer to the optical axis due to the wideness of the area. In order to increase the accuracy and widen the area, it is important that the exit pupil should be wide, and it is required to effectively utilize the exit pupil as wide as possible in terms of design.

It has conventionally been impossible to replace the AF module in correspondence with the type or state of each lens. Therefore, the AF module has been designed in accordance with the lens of the minimum exit pupil among the lenses to be used. That is, even with an imaging lens capable of detecting the focus with high accuracy or with a lens capable of detecting the focus in a wide area, the focus detecting operation is executed with the accuracy and the area range according to a lens in undesirable conditions.

SUMMARY OF THE INVENTION

Accordingly, it is an object of the present invention to provide a focus detection device that can efficiently utilize the luminous flux that has passed through the exit pupil of an object lens according to the object lens characteristics.

It is another object of the present invention to provide a spatial modulation unit that can efficiently utilize the luminous flux that has passed through the exit pupil of an object lens according to the object lens characteristics.

It is still another object of the present invention to provide a luminous flux deflection device that can efficiently utilize the luminous flux that has passed through the exit pupil of an object lens according to the object lens characteristics.

It is still another object of the present invention to provide a camera that can efficiently utilize the luminous flux that has passed through the exit pupil of an object lens according to the object lens characteristics.

It is still another object of the present invention to provide a focus control device that can efficiently utilize the luminous flux that has passed through the exit pupil of an object lens according to the object lens characteristics.

In order to achieve the above object, according to one aspect of the present invention, there is provided a focus detection device comprising: a focus detector; a deflector that is arranged between a lens and the focus detector and that deflects luminous flux guided from the lens to the focus detector, wherein the deflector enables a deflection characteristic of the luminous flux guided from the lens to the focus detector to be changed; and a controller for controlling the deflector on a basis of pupil information upon an exit pupil of the lens and for changing the deflection characteristic of the luminous flux guided from the lens to the focus detector.

In the device, the controller controls the deflector on a basis of the size, position and so on of the exit pupil of the lens and guides the luminous flux from the lens to the focus detector by appropriately deflecting the luminous flux.

The luminous flux to be guided to the focus detector can be selected by changing the state of deflection of the luminous flux by the deflector, and therefore, sensing in a wide range can be executed regardless of the size, position and so on of the exit pupil of the lens.

For example, even a lens having a small aperture size, of which the f value has been too large to be detected with a fixed optical path as in the conventional case, can be detected if the luminous flux within the full span of its exit pupil is guided to the focus detector. In contrast to this, in the case of a lens having a large aperture size, the detection accuracy can be improved by utilizing the luminous flux located outside the conventional fixed optical path, i.e., in an area apart from the optical axis and the luminous flux in an area wider than the conventional area.

It is assumed that two image sensors are arranged while being displaced in the direction of optical axis of the imaging lens and the focal position is estimated without moving the focus lens by predicting (extrapolating or interpolating) a difference between two contrast output values. If the quantity of defocus is great, then the focal position can be found more easily as the distance between the two sensor positions in the direction in which the sensors are arranged (focus displacement quantity) is greater. Conversely, if the quantity of defocus is small, then it is preferred to set small the distance between the two sensor positions in the direction in which the sensors are arranged (focus displacement quantity) in order to increase the focus detection accuracy. If the focus detection device having the above-mentioned construction is employed, then the accuracy of the final focal position determination (AF completion) can be increased by largely separating the focal positions of the two sensors apart from each other by the deflector when the defocus is large and reducing the distance in the optical axis direction as the focusing is becoming advanced. Even when the defocus is large, rapid AF can be achieved.

Therefore, the luminous flux that has passed through the exit pupil can be efficiently utilized according to the object lens.

In order to achieve the above object, according to another aspect of the present invention, there is provided a spatial modulation unit comprising: a deflector having a plurality of deflection cells arranged in one of a concentric oval shape or a concentric quasi-oval shape; and a controller for electromagnetically controlling the deflection cells of the deflector so as to change a focal position of luminous flux incident on the deflection cells of the deflector.

In order to achieve the above object, according to still another aspect of the present invention, there is provided a luminous flux deflection device comprising: a deflector that is arranged between a lens and a detector and that deflects luminous flux guided from the lens to the detector, wherein the deflector enables a deflection characteristic of the luminous flux guided from the lens to the detector to be changed; and a controller for controlling the deflector on a basis of pupil information upon an exit pupil of the lens and for changing the deflection characteristic of the luminous flux guided from the lens to the detector.

In order to achieve the above object, according to still another aspect of the present invention, there is provided a camera comprising: a focus detector; a deflector that is arranged between a lens and the focus detector and that deflects luminous flux guided from the lens to the focus detector, wherein the deflector enables a deflection characteristic of the luminous flux guided from the lens to the focus detector to be changed; and a controller for controlling the deflector on a basis of pupil information upon an exit pupil of the lens and for changing the deflection characteristic of the luminous flux guided from the lens to the focus detector.

In order to achieve the above object, according to still another aspect of the present invention, there is provided a focus control device comprising: a lens for transmitting subject light; a driver for driving the lens;

an image sensor for detecting at least a part of the subject light transmitted through the lens; a spatial modulation unit that is arranged between the lens and the image sensor and that is able to electromagnetically change a focal position; a contrast type of focus detector for detecting a focal position on a basis of sharpness of an image detected by the image sensor; and a control unit for controlling the spatial modulation unit and the contrast type of focus detector so that the spatial modulation unit can change the focal position until the contrast type of focus detector detects the focal position and then for controlling the driver so as to drive the lens on a basis of the focal position detected by the contrast type of focus detector, wherein a change by the spatial modulation unit of the focal position is one of a continuous change and a change made step by step.

In order to achieve the above object, according to still another aspect of the present invention, there is provided a focus control device comprising: a lens for transmitting subject light; a driver for driving the lens; an image sensor for detecting at least a part of the subject light transmitted through the lens; a spatial modulation unit that is arranged between the lens and the image sensor and that is able to electromagnetically change a focal position; a phase difference type of focus detector for detecting a focal position by using an image detected by the image sensor; and a control unit for controlling the spatial modulation unit and the phase difference type of focus detector so that the phase difference type of focus detector can detect the focal position after the spatial modulation unit changes the focal position on a basis of pupil information upon an exit pupil of the lens and then for controlling the driver so as to drive the lens on a basis of the focal position detected by the phase difference type of focus detector.

BRIEF DESCRIPTION OF THE DRAWINGS

These and other objects and features of the present invention will become clear from the following description taken in conjunction with the preferred embodiments thereof with reference to the accompanying drawings, in which:

FIGS. 11A through 11D are explanatory views of combinations of the phase difference type of AF module and the optical path deflection unit according to an embodiment of the present invention;

FIG. 12 is a schematic view of the essential part of the camera including the reflection type optical path deflection unit;

DETAILED DESCRIPTION OF THE PREFERRED EMBODIMENTS

Figure 1:
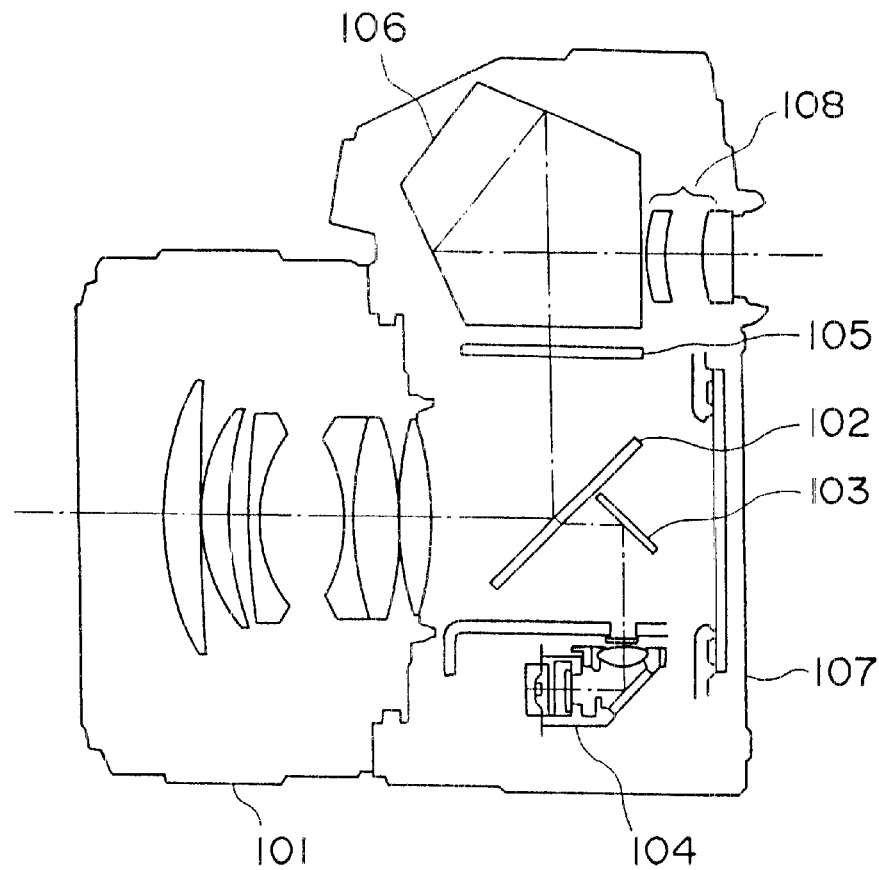
FIG. 1 is a schematic view of a camera having a built-in AF module according to an embodiment of the present invention.

Before the description of the preferred embodiments according to the present invention proceeds, it is to be noted that like or corresponding parts are designated by like reference numerals throughout the accompanying drawings.

A detailed description is made below upon a spatial modulation unit, a luminous flux deflection device, a focus detection device, a camera and a focus control device, which are capable of changing the focal position, and which are respectively according to embodiments of the present invention, with reference to the drawings.

FIG. 1 is the camera having a built-in module of a focus detection device. The built-in module is referred to as "AF (auto-focus) module", hereinafter. This camera is constructed of a camera body 107 and an object lens, or an imaging lens 101. Light from a subject is split into two optical paths by a main mirror 102. The light reflected on the main mirror 102 passes through a finder screen 105 and enters the human eye from an ocular lens 108 through a pentagonal roof prism 106. The light that has passed through the main mirror 102 is reflected on an incident optical path deflection unit 103 of a variable optical path region and incident on an AF module 104.

Figure 2:
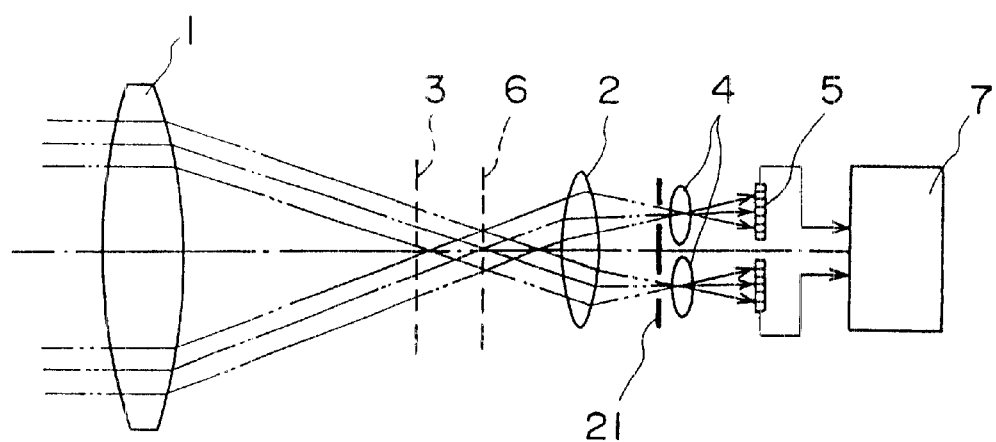
FIG. 2 is a schematic view of the AF module.

FIG. 2 shows a schematic view of the AF module 104. The AF module 104 is constructed of a condenser lens 2 for converging the light that has passed through different pupil positions of the lens 1, which is shown by schematically illustrating the object lens inside the imaging lens 101, a diaphragm mask 21, an image re-forming lens 4 and a photoelectric transducer element 5. The subject light that has passed through the object lens 1 forms two subject images on the photoelectric transducer element 5 by the condenser lens 2, diaphragm mask 21 and image re-forming lens 4, which are located behind a predetermined focal plane 6 of the object lens 1. An incident optical path deflection unit 103 of variable optical path region exists in a position 3 ahead of the predetermined focal plane 6. A system controller 7 detects the quantity and direction of defocus of the lens 1 from the in-focus position by detecting the relative positional relation between the two subject images.

Figure 3A:
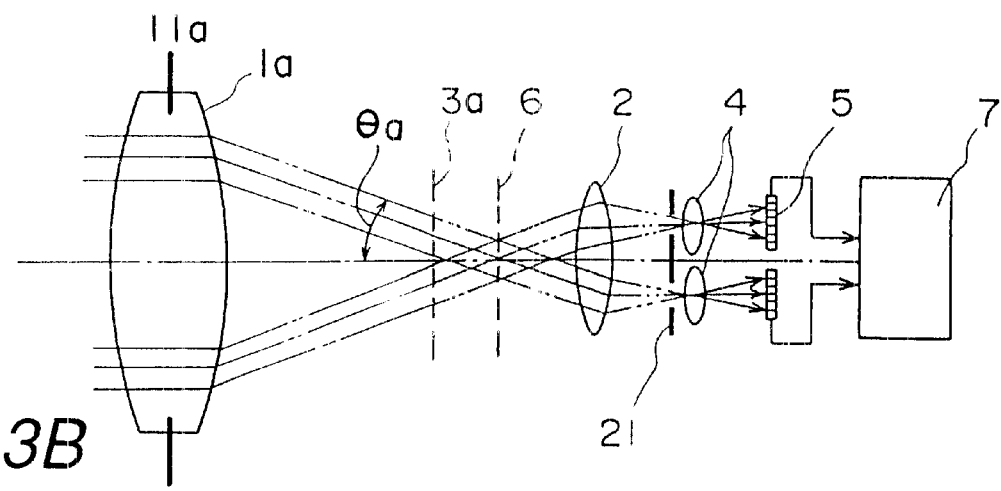
FIGS. 3A through 3C are explanatory views of a change of state caused by the mounting of a lens.
Figure 3B:
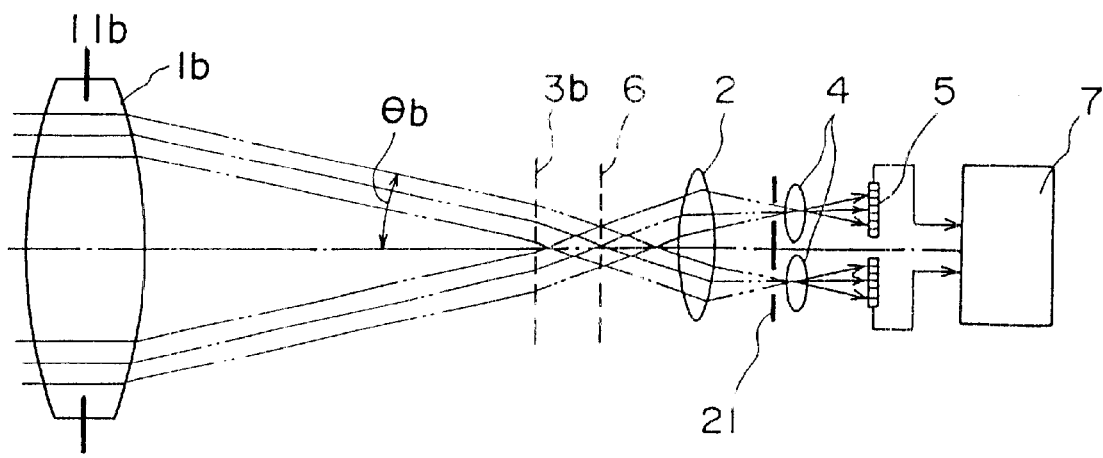
Figure 3C:
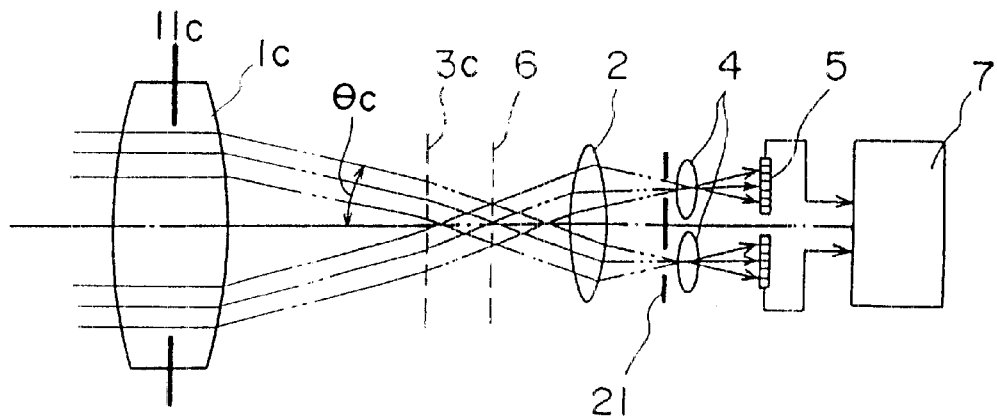

FIGS. 3A through 3C show a plurality of states in which various imaging lenses are mounted. FIG. 3A shows a state in which a standard lens 1a having an exit pupil 11a is mounted. FIG. 3B shows a state in which a telephoto lens 1b is mounted. An exit pupil 11b of the telephoto lens 1b is located farther in distance from the focal plane 6 than that of the standard lens 1a. FIG. 3C shows a state in which a popular-priced lens 1c whose exit pupil 11c is made narrow to the optical axis due to a large f value is mounted. FIGS. 3A, 3B and 3C also show lens states in which the pupil position and the pupil diameter are changed according to the focusing or zooming.

In contrast to this, if the luminous flux for detecting the focus is switched according to the exit pupil of the lens as shown in FIGS. 3A, 3B and 3C, then an accuracy and a wide area, which have not been obtained, can be obtained.

The function of deflecting the optical path is owned by the sub-mirror 103.

For example, assuming that the state of FIG. 3A is the initial state, then the optical path straightly extends in a sub-mirror position 3a.

In the case where the exit pupil position is far as shown in FIG. 3B, the luminous flux is deflected in a position 3b so that the luminous flux located close to the optical axis is sensed. Although the luminous flux is simply refracted parallel in the figure, there may be a refraction method having an image forming power besides the parallel refraction method. If an image forming power is provided, then part of the function of the condenser lens 2 is to be provided. By dividing the function, the area of the sub-mirror can be controlled in the position 3b. For example, with a compact configuration permitted, the internal arrangement of the camera can be easily made.

FIG. 3C shows the case where the exit pupil diameter is small. Also, in this case, the luminous flux is deflected in a position 3c so that the luminous flux located close to the optical axis is sensed.

Figure 4:
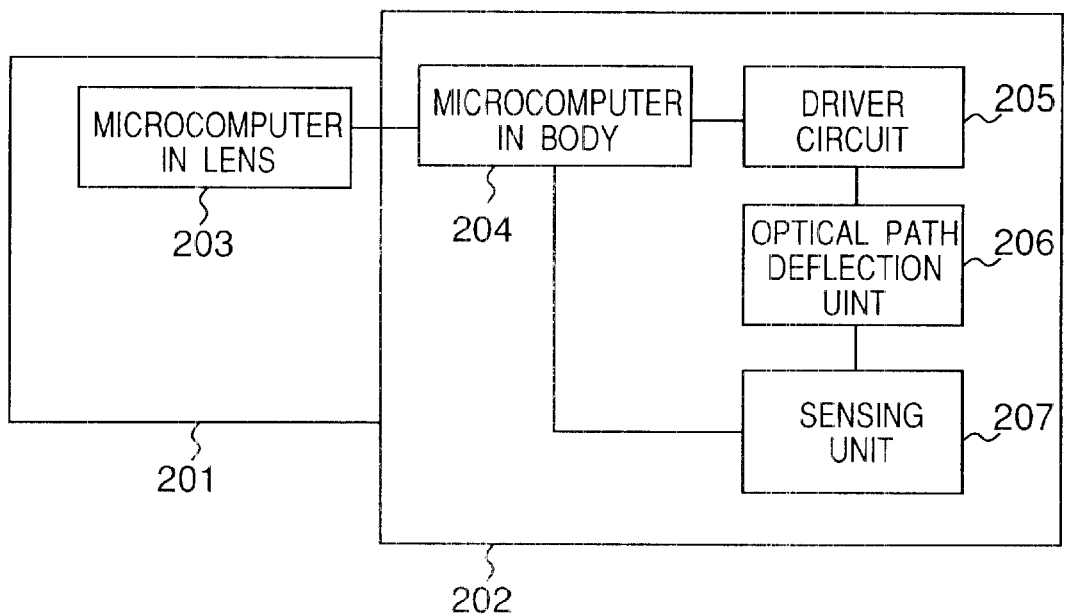
FIG. 4 is a block diagram of a camera system.

A system constituting this will be described with reference to FIG. 4. FIG. 4 shows a camera system, in which an imaging lens 201 includes a microcomputer 203 (lens microcomputer) and a camera body 202 includes a microcomputer 204 (body microcomputer), a driver circuit 205, an optical path deflection unit 206 and a sensing unit 207. Information of the pupil position and pupil diameter of the imaging lens is transferred from the lens microcomputer 203 to the body microcomputer 204. The microcomputer 204 obtains the optical path that can be sensed by the sensing unit 207 through calculation on the basis of the information, controls the driver circuit 205 and drives the optical path deflection unit 206.

Figure 5A:
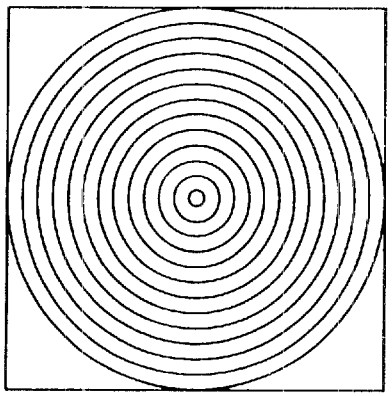
FIGS. 5A and 5B are explanatory views of an optical path deflection unit according to an embodiment of the present invention.
Figure 5B:
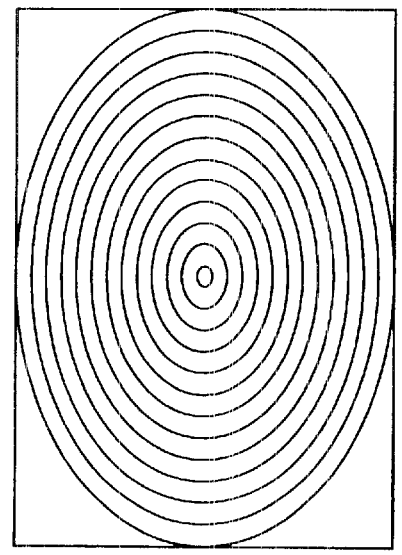

FIGS. 5A and 5B show this optical path deflection unit 206. The optical path deflection unit corresponds to the sub-mirror 103 of FIG. 1 and has a concentric circular deflection characteristic as shown in FIG. 5A when viewed from the imaging lens side. That is, the degree of deflection of the luminous flux is great in a place located apart from the optical axis center of the imaging lens, and the degree of deflection is small in a place located close to the optical axis center. The luminous flux straightly travels in the optical axis center. This characteristic is similar to that of the so-called concave mirror. However, in contrast to the fact that the concave mirror has a fixed focal position, this optical path deflection unit has a variable focal position.

The optical path deflection unit is used as a sub-mirror as indicated by the reference numeral 103 in FIG. 1. That is, the luminous flux center is required to be largely warped to an angle of about 90 degrees. Accordingly, despite the appearance shown in FIG. 5A viewed from the imaging lens side, the optical path deflection unit receives thereon a concentric oval shape as shown in FIG. 5B. By virtue of the provision of the concentric oval shape, there can be provided luminous flux of an unchanged luminous flux center for the sensing unit even when the optical path is deflected at an angle of about 90 degrees. The optical path deflection unit may be a liquid crystal deflection unit, a micro diffraction grating or a digital micro-mirror device. However, the detail will be provided later.

Figure 6:
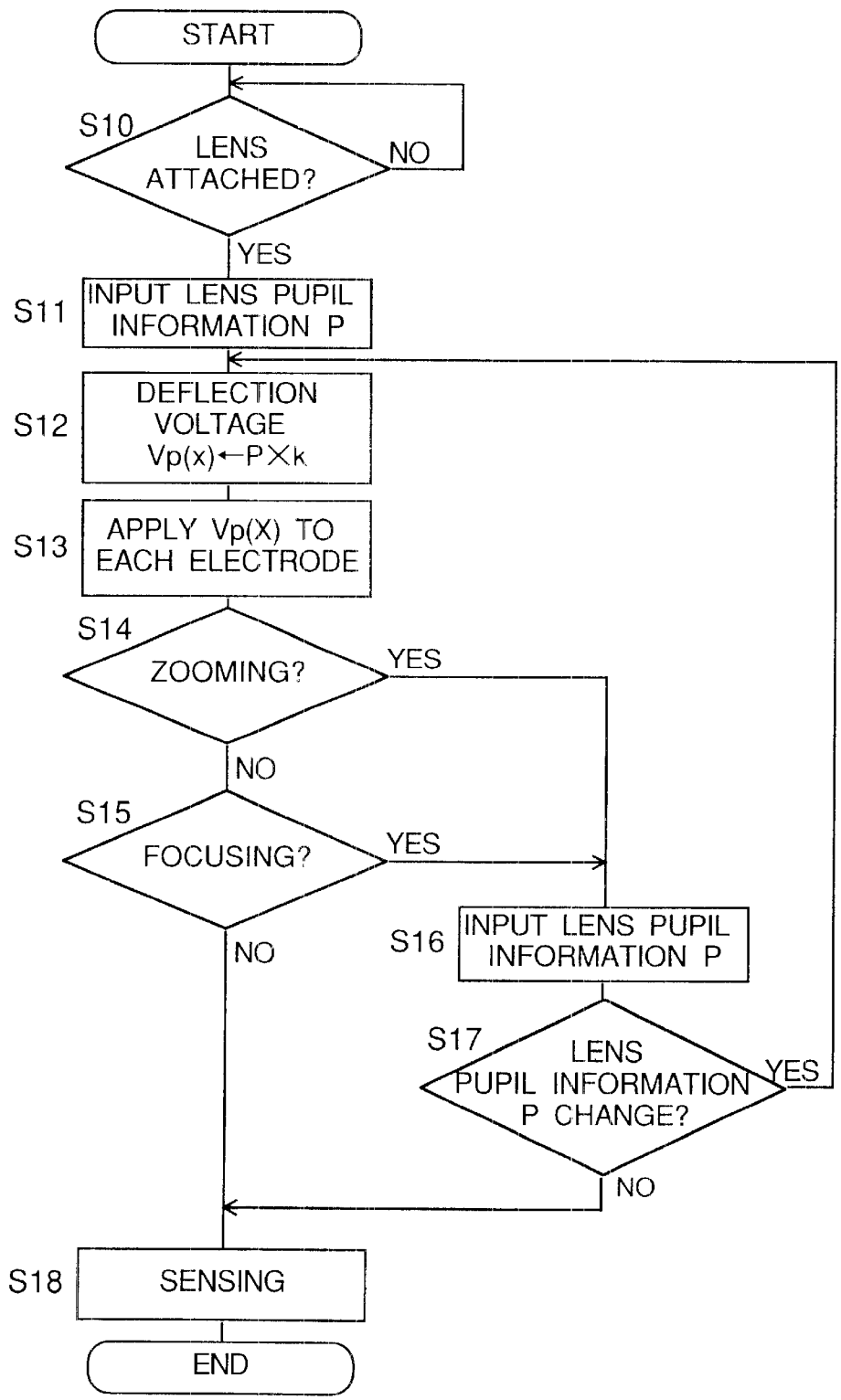
FIG. 6 is a flowchart for using the optical path deflection unit.

The flow of the system employing this optical path deflection unit will be described with reference to the flowchart of FIG. 6.

First, the body microcomputer 204 determines whether or not the lens 201 is mounted (S10). If the lens 201 is mounted, then the lens microcomputer 203 outputs lens pupil information P to input the same to the body microcomputer 204 by request from the body microcomputer 204 (S11).

The information P is defined as a function of pupil diameter information (i.e., a function: f value=½ tanθ, θ: an angle made between luminous flux that has passed through the outermost periphery of the pupil and the imaging lens optical axis, indicated by θa, θb and θc in FIGS. 3A, 3B and 3C) viewed in sensing. Subsequently, information for operating the optical path deflection unit 206 on the basis of the information P, i.e., an operating voltage Vp(x) is obtained in this case (S12).

The operating voltage Vp(x) is defined by the equation: Vp(x)=P×k, where k is a coefficient of transformation into a deflection unit drive voltage. In this case, the operating voltage to be given to the deflection unit is of a deflection with a focus and has different deflection characteristics depending on each concentric oval as shown in FIGS. 5A and 5B. That is, the given voltage differs depending on the peripheral portion and the center portion. Assuming that a variable concerning the position (of each oval) is x, then the given voltage is a function expressed by Vp(x).

Next, a control operation to give this voltage that differs depending on each position to the optical path deflection unit 206 through the driver circuit 205 is executed in step S13. In this case, the optical path relative to the sensing unit 207 is deflected.

It is determined in step S14 whether or not the imaging lens 201 has been zoomed. If the lens has been zoomed, the normal lens has varied pupil information, and therefore, the lens pupil information P is inputted again in step S16. Then, if the lens information P is changed meaning that the pupil position or the pupil diameter has varied, then the program flow returns to step S12 to operate again the optical path deflection unit 206 so that an optical path appropriate for the varied pupil position or pupil diameter can be obtained.

Even if the zooming operation has not been executed in step S14, then it is checked in step S15 whether or not the focusing operation has been executed. The pupil position and the pupil diameter are varied also by executing focusing. If a variation has occurred, then the program flow proceeds to step S16 similarly to the zooming operation to execute the processing from the re-input of the pupil information P. If the focusing operation has not been executed in step S15 or if the pupil information is not varied in step S17, then sensing operation is executed in step S18. Through these processes, the sensing operation can be executed without the shading caused by the pupil of the lens.

Figure 7:
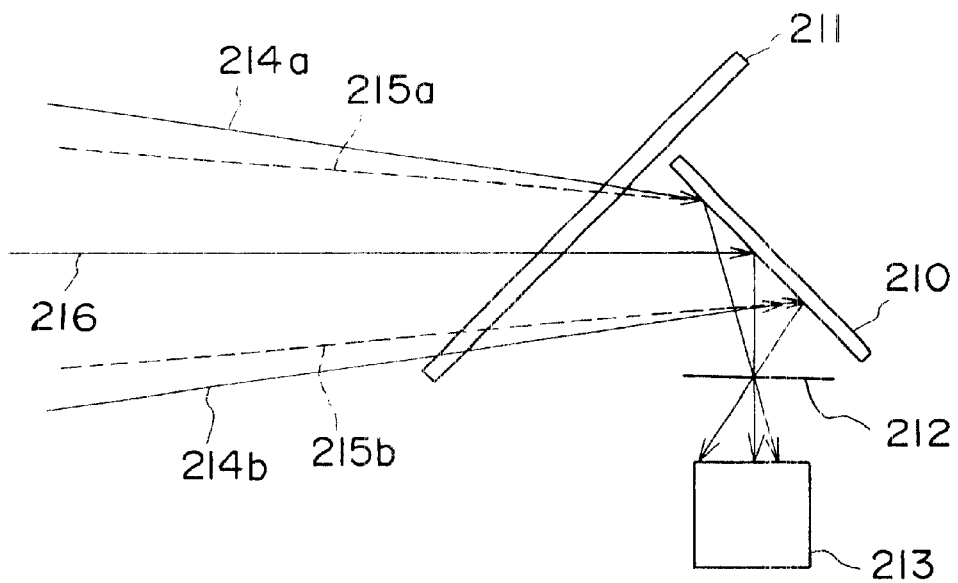
FIG. 7 is a schematic view of the essential part of a camera including a reflection type optical path deflection unit according to an embodiment of the present invention.

FIG. 7 shows an optical device including a reflection type optical path deflection unit. This figure shows the construction of the optical peripherals of the camera. There are shown a main mirror 211 of the camera, a sub-mirror 210 that is the reflection type optical path deflection unit, a film equivalent plane 212 (imaginary line merely indicating the plane), a sensing unit 213 and an imaging lens optical axis 216. If the lens has a great exit pupil or in such a state, then the subject light is incident on the sensing unit 213 within the optical path range indicated by the reference numerals 214a and 214b. If the lens has a small exit pupil or in such a state, then the optical path deflection unit 210 operates so that the subject light is incident on the sensing unit 213 within the optical path range indicated by the reference numerals 215a and 215b.

Figure 8:
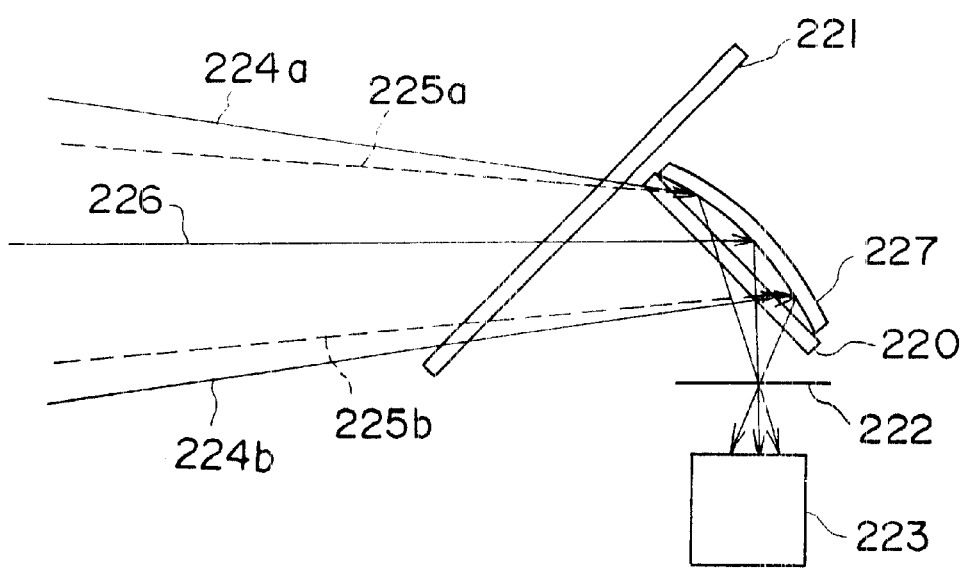
FIG. 8 is a schematic view of the essential part of a camera including a transmission type optical path deflection unit according to an embodiment of the present invention.

FIG. 8 shows the construction of optical system peripherals employing a transmission type optical path deflection unit. There are shown a main mirror 221 of the camera, a transmission type optical path deflection unit 220, a sub-mirror 227 that is a concave mirror, a film equivalent plane 222 (line merely indicating the plane), a sensing unit 223 and an imaging lens optical axis 226. The concave mirror 227 has the operation of adjusting the optical path length of the sensing unit. Accordingly, this contributes to the compacting of the sensing unit. If the lens has a great exit pupil or in such a state, then the subject light is incident on the sensing unit 223 within the optical path range indicated by the reference numerals 224a and 224b. If the lens has a small exit pupil or in such a state, then the transmission type optical path deflection unit 220 operates so that the subject light is incident on the sensing unit 223 within the optical path range indicated by the reference numerals 225a and 225b. These functions are the same as those of the reflection type optical path deflection unit 210.

Figure 9:
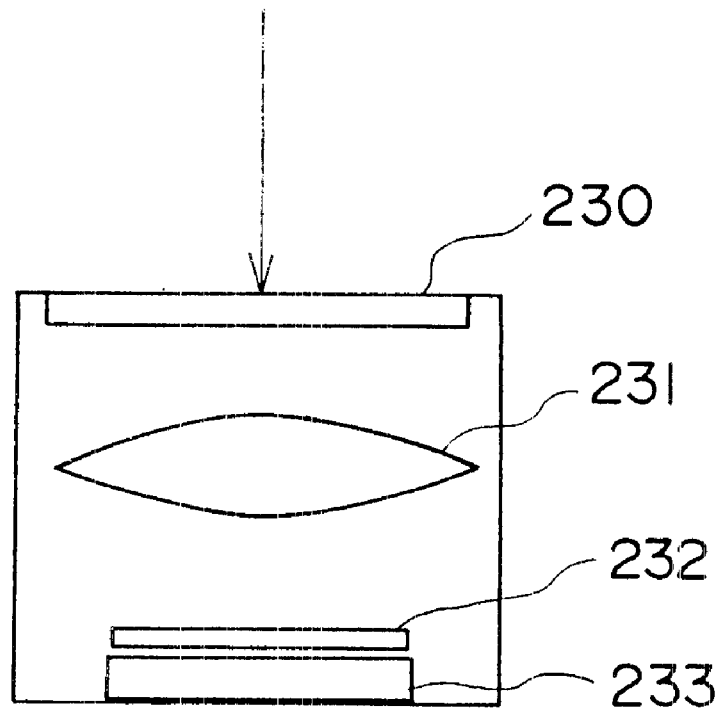
FIG. 9 is a schematic view of a photometric module.

FIG. 9 and FIGS. 10A through 10D show an example of the sensing unit. FIG. 9 shows a photometric module. There are shown a diffusion screen 230, a lens 231 for forming an image from the diffusion screen, an infrared light cutoff filter 232 and a multi-division photodiode 233. The luminance and luminance distribution of the image projected on the screen are subjected to divided photometry by the multi-division photodiode 233.

Figure 10A:
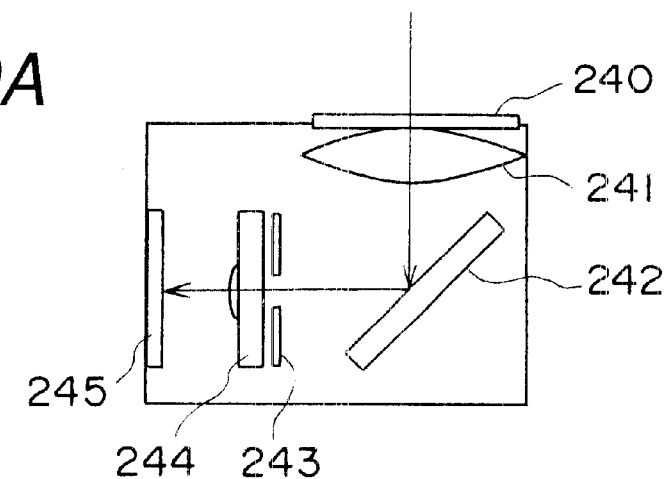
FIGS. 10A through 10D are schematic views of a phase difference type of AF module.

FIG. 10A shows a phase difference type of AF sensor module. There are shown an infrared light cutoff filter 240, a condenser lens 241, a reflection mirror 242, a diaphragm mask 243, a separator lens 244 and a multi-division sensor 245. The shape of the diaphragm mask 243 is projected on the exit pupil of the imaging lens by the condenser lens 241. Conversely speaking, light in a region restricted by this diaphragm mask 243 is guided to the multi-division sensor 245.

Figure 10B:
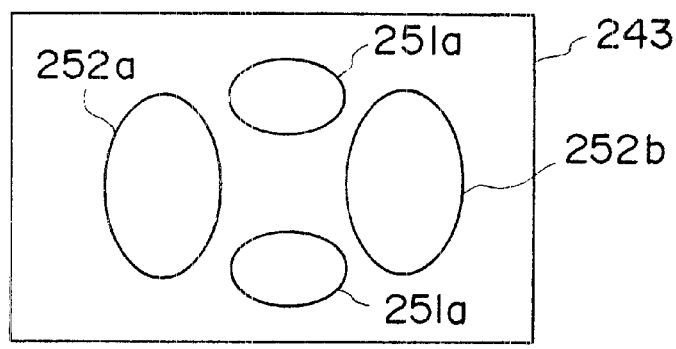

As shown in FIG. 10B, the diaphragm mask 243 has a cross-like arrangement. That is, the diaphragm mask includes horizontal phase difference detection elements 252a and 252b and vertical phase difference detection elements 251a and 251b. The horizontal phase difference detection elements 252a and 252b, provided for the area sensor, have a great aperture area.

Figure 10C:
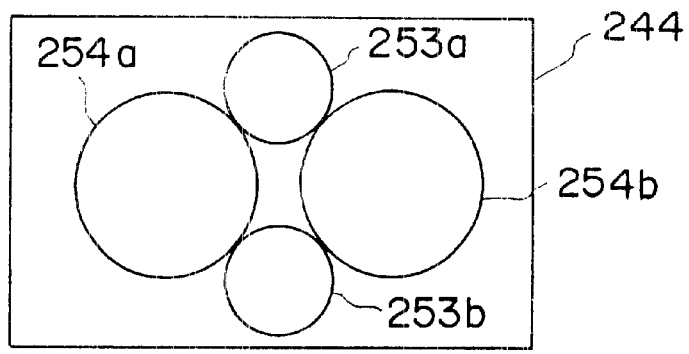

FIG. 10C shows the separator lens 244, which includes horizontal phase difference detection elements 254a and 254b and vertical phase difference detection elements 253a and 253b.

Figure 10D:
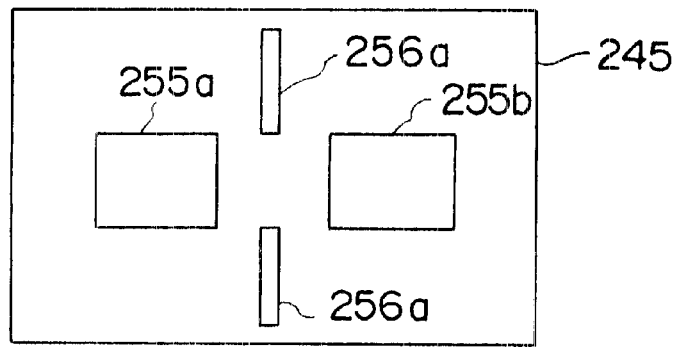

FIG. 10D shows the multi-division sensor 245. The multi-division sensor 245 includes horizontal phase difference detection area sensors 255a and 255b and vertical phase difference detection line sensors 256a and 256b.

FIG. 11A through FIG. 11D show a combinational function of the phase difference type of AF sensor module and the optical path deflection unit.

For example, the pupil shape of the imaging lens that is currently mounted is denoted by the reference numeral 260, and the minimum pupil shape of another lens or the imaging lens possibly occurring under specified conditions is denoted by the reference numeral 261. The specified conditions are as explained with reference to FIG. 3, where the pupil diameter is minimized due to the lens that has the minimum pupil diameter or by zooming or focusing.

Conventionally, in the case that the lens has small exit pupil, a design as shown in FIG. 11A is provided, corresponding to the small exit pupil thereof. That is, a diaphragm mask as shown in FIG. 10B is projected on the inside of the pupil shape 261. The diaphragm mask projection in the horizontal direction is indicated by the reference numerals 262a and 262b, and the diaphragm mask projection in the vertical direction is indicated by the reference numerals 263a and 263b. Conventionally, such a condition of the diaphragm mask projections is fixed. Contrastively, in the embodiment, it is able to provide a design such that the horizontal diaphragm mask projections 264a and 264b are expanded to the full span of the pupil diameter to widen the base length as far as possible and obtain a high focus detection accuracy by appropriately deflecting the luminous flux. As is apparent from the widened area of the illustrated luminous flux, the focus detection area can be set wide.

On the other hand, conventionally, under the design as shown in FIG. 11B, if a lens having a small pupil diameter is mounted or if a condition in which the pupil diameter is reduced is provided, then the horizontal diaphragm projections 271a and 271b have conventionally been jutting out of the pupil 270, as shown in FIG. 11C. According to the embodiment, the luminous flux can be secured without pupil shading by reducing the optical path by the optical path deflection unit of the sub-mirror section in order to prevent the horizontal diaphragm projections 273a and 273b from jutting out of the pupil 270.

The reason why the vertical base length is shorter than the horizontal base length is ascribed to dimensional limitations in the vertical direction of the sub-mirror (optical path deflection unit). If the vertical dimension is expanded equivalent to the horizontal dimension, then the size of the sub-mirror becomes equal to the size of the main mirror in order to secure the optical path. That is, the volume of the mirror box section of the camera is required to be about doubled, which is disadvantageous.

However, if a construction in which the sub-mirror is not arranged at an angle of 45° as shown in FIG. 12, then it is possible to provide a construction in which the volume of the mirror box of the camera is not increased to double the volume. FIG. 12 shows an optical device including a reflection type optical path deflection unit. In this case, another construction of the peripherals of the optical system of the camera is shown. There are shown a main mirror 286 of the camera and a sub-mirror 287 that is the reflection type optical path deflection unit. The reference numeral 288 denotes a phase difference type of AF sensor module. There are shown a reflection mirror 282, an infrared light cutoff filter 280, a condenser lens 281, a diaphragm mask 283, a separator lens 284 and a multi-division sensor 285. In this construction, the sub-mirror 287 is raised rather upright at an angle of not smaller than 45°. This arrangement allows the area of the sub-mirror 287 that is the reflection type optical path deflection unit to be increased and allows the sensing region to be set large.

Figure 13:
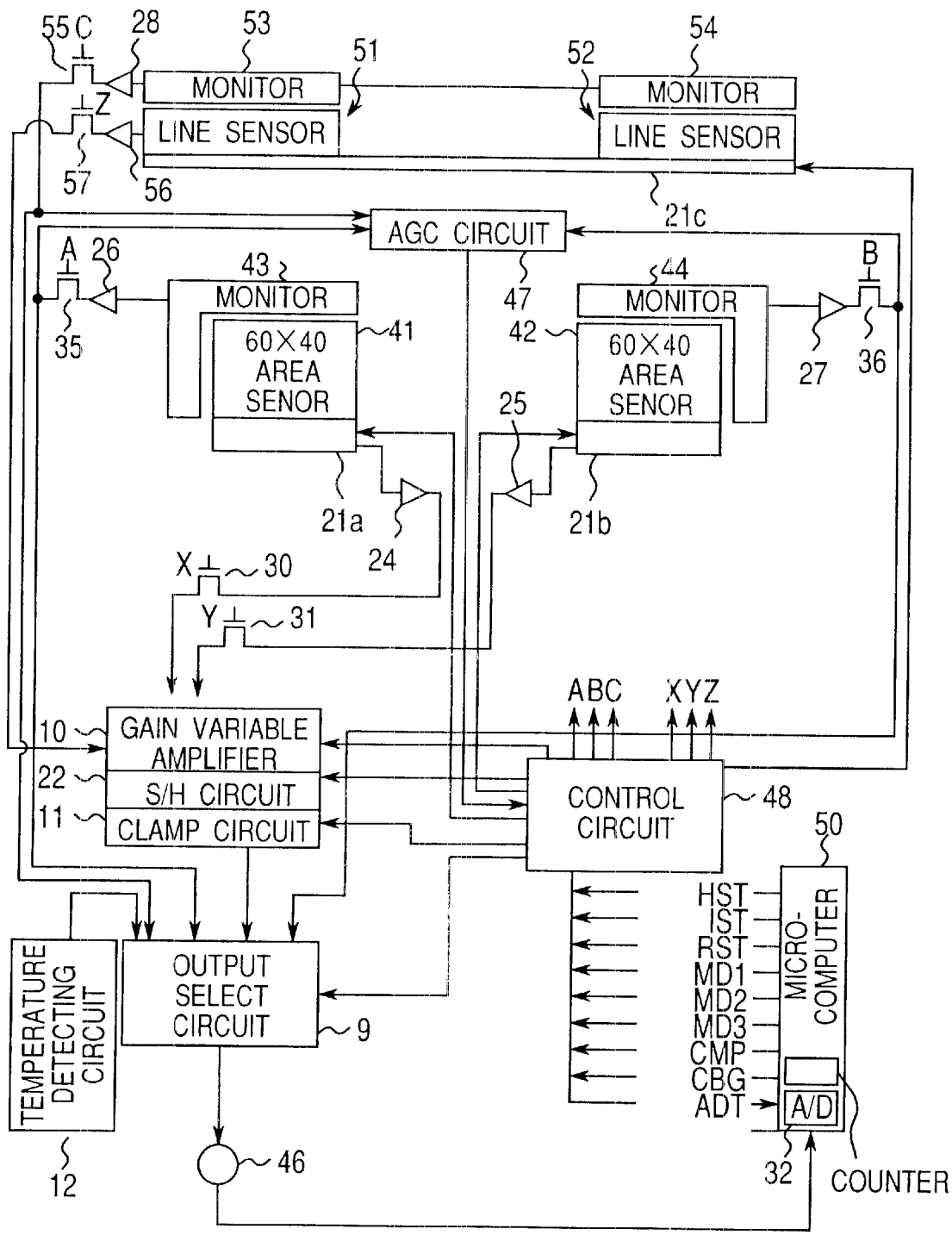
FIG. 13 is a block diagram of the essential part of the camera including the reflection type optical path deflection unit.

FIG. 13 shows the circuit construction and the control system of the multi-division sensor 245 of FIG. 10D. FIG. 13 is a block diagram of the devices of the image detection system of a camera including two sensors 41, 42, 51 and 52 and a control circuit 48 for controlling the sensors.

Outputs of the area sensors 41 and 42 and the line sensors 51 and 52 are used for AF and image blur detection as described later. Monitors 43, 44, 53 and 54 of the sensors 41, 42, 51 and 52 are photoelectric transducer elements.

This device is constructed of the main components of the area sensors 41 and 42 having horizontal registers 21a and 21b, L-figured monitors 43 and 44 arranged along two sides of the area sensors 41 and 42, line sensors 51 and 52 having a horizontal register 21c, I-figured monitors 53 and 54 of the sensors, an AGC circuit 47, a control circuit 48, a variable gain amplifier 10, an S/H (sample hold) circuit 22, a clamp circuit 11, an output selection circuit 9, a temperature detection circuit 12 and a microcomputer 50 and is provided with output buffers and output switches for the components.

In detail, there are provided the output buffers 26, 27 and 28 and output switches 35, 36 and 55 of the monitors 43, 44, 53 and 54 as well as the output buffers 24, 25 and 56 and output switches 30, 31 and 57 of horizontal transfer registers 21a, 21b and 21c. In this device, the control circuit 48 is referred to as a sensor drive section, while the variable gain amplifier 10, S/H circuit 22, clamp circuit 11 and output selection circuit 9 are each referred to as an output processing circuit section.

In this case, the monitors 43, 44, 53 and 54 monitor the charge storage of the corresponding sensors 41, 42, 51 and 52.

The horizontal transfer registers 21a, 21b and 21c temporarily hold the electric charges of the sensors 41, 42, 51 and 52 and serially output the same. The clamp circuit 11 operates in accordance with a timing at which the electric charges of black reference pixel (OB) are outputted from the sensors 41, 42, 51 and 52 and clamps the voltage of a dark current at a specified voltage. The output selection circuit 9 is common to all the outputs and selectively outputs the outputs of the sensors 41, 42, 51 and 52 and the output of the temperature detection circuit 12 by the control circuit 48. This device is formed as a one-chip IC (Integrated Circuit) obtained by providing the aforementioned components except for the microcomputer 50 on one substrate.

In the following description, the devices formed on this chip are defined to be internally formed, while the devices that are not formed on this chip are defined to be externally formed.

One of monitor signals outputted from the monitors 43, 44, 53 and 54 is selectively given to the AGC circuit 47 and the output selection circuit 9 via the output buffers 26, 27 and 28 and the output switches 35, 36 and 55.

The switches 35, 36 and 55 are each formed of a MOS transistor, which is made conductive by receiving at its gate electrode a low-level switching signal A or B generated from the control circuit 48. Depending on which switch is made conductive, the monitor signal to be given to the AGC circuit 47 and the output selection circuit 9 is selected. That is, by the switching signals A, B or C, one of the monitor signals of the monitors 43, 44 or 53+54 can be selected. The monitor signal selection will be described later.

In the sensors 41, 42, 51 and 52 and the monitors 43, 44, 53 and 54, integration concurrently starts. If the integration starts, then the AGC circuit 47 is monitoring the event that the inputted monitor signal reaches a specified voltage and, when the voltage reaches the specified voltage, it transmits the information of the event to the control circuit 48.

Upon receiving the information, the control circuit 48 terminates the integration of the sensors 41, 42, 51 and 52 and transmits the event that the integration is terminated to the external microcomputer 50 (this termination of integration is referred to as an "automatic termination" hereinafter).

The AGC circuit 47 can be constructed of a comparator that uses, for example, the aforementioned specified voltage as a reference voltage and uses the aforementioned monitor signal as a comparison voltage.

If the monitor signal does not reach the specified voltage after a lapse of a specified time, i.e., if the information of the event that the voltage has reached the specified voltage is not transmitted from the control circuit 48 to the external microcomputer 50 after a lapse of the specified time, then the microcomputer 50 designates the control circuit 48 to forcibly terminate the integration of the sensors 41, 42, 51 and 52 to execute forcible termination.

In the case of either automatic termination or forcible termination, the monitor signal given from the output selection circuit 9 to the external microcomputer 50 via a $V_{OUT}$ terminal 46 when the integration is terminated is subjected to A/D (analog-to-digital) conversion by a built-in A/D converter 32 of the microcomputer 50 in accordance with the timing of the termination of integration. According to the digital value, the amplification factor to be effected on the output of the area sensor is determined. This amplification factor is transmitted to the control circuit 48, and the amplification factor of the variable gain amplifier 10 is set. In this case, if the integration is automatically terminated, then the amplification factor becomes one. In the case of the automatic termination, the amplification factor may be determined to be one without determining the amplification factor by subjecting the monitor signal to A/D conversion.

After the termination of integration, the outputs of the sensors 41, 42, 51 and 52 are transferred to the horizontal transfer registers 21a, 21b and 21c and inputted via the output buffers 24, 25 and 56 and the switches 30, 31 and 57 to the variable gain amplifier 10 in which the outputs are amplified by the previously set amplification factor. The switches 30, 31 and 57 have constructions similar to those of the switches 35, 36 and 55, while the control circuit 48 generates switching signals X, Y and Z and executes selection between the outputs of the sensors 41, 42, 51 and 52 to be given to the variable gain amplifier 10.

Figure 14:
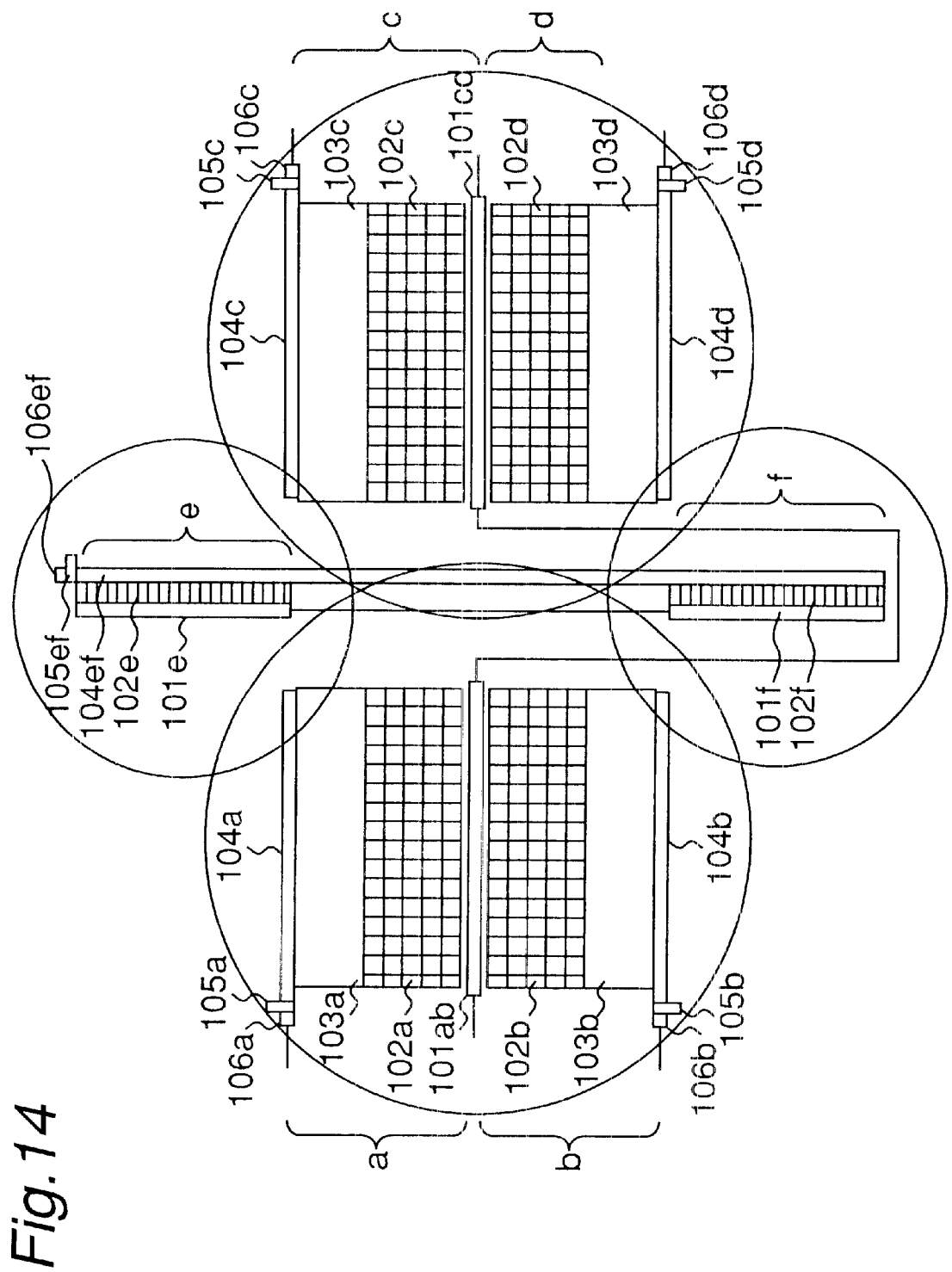
FIG. 14 is a view of a circuit construction.

With reference to FIG. 14, a focus detection use charge storage type sensor in which the monitor is not the L-figured monitor but the I-figured monitor with a 4-area sensor obtained by dividing the area sensor section into two portions will be described. In this case, the description is provided on the basis of the CCD type.

There are area sensor sections a, b, c and d and line sensor sections e and f. The reference numerals 101ab, 101cd, 101e and 101f denote luminance monitors for measuring the subject luminance for determining the charge storage time. Light-receiving sections (photoelectric transducer sections) 102a, 102b, 102c, 102d, 102e and 102f receive light from the subject and photoelectrically convert the light from the subject. Charge storage sections 103a, 103b, 103c and 103d temporarily store electric charges generated by the light-receiving sections 102. The charge storage sections are set in the case of an FT (Frame Transfer) type or an FIT (Frame Interline Transfer) type. In an IT (Interline Transfer) type, which executes a reading operation without retaining electric charges, the charge storage sections do not exist. The line sensor sections e and f are not separately provided with a charge storage section, and the electric charges are stored in the light-receiving sections 102e and 102f or a shift register section 104ef as described later. The reference numerals 104a, 104b, 104c, 104d and 104ef denote shift register sections (read register sections). Area sections a, b, c and d execute separate read. The reference numerals 105a, 105b, 105c, 105d and 105ef denote output gates, while the reference numerals 106a, 106b, 106c, 106d and 106ef denote read sections. Electric charge data are read as voltage data. In this case, there is one shift register section 104ef since the line section concurrently reads electric charges from the portions e and f. This arrangement is provided for uniforming the data characteristics of the portions e and f as far as possible by commonly using the read section 106ef. The data characteristics mean the SN (signal-to-noise) characteristic of the read section and the amplification characteristics of the subsequent stages.

Line luminance monitors 101e and 101f are connected in the shortest distance. Area luminance monitors 101ab and 101cd are connected bypassing the line light-receiving section. That is, in the monitor, the luminance monitors 101ab and 101cd for the area sections are commonly driven by one operation, and the area sensor sections a, b, c and d divided into four portions execute same integration control. There are four read sections, by which the read time can be made fast.

It is to be noted that four circles in the figure indicate luminous flux regions in which light that has passed through the imaging lens, the optical path deflection unit, the condenser lens, the diaphragm mask and the separator lens is projected on the sensor. As illustrated, the luminous flux is projected in a circular shape by the operation of the optical path deflection unit without the shielding of the luminous flux due to the imaging lens.

Figure 15A:
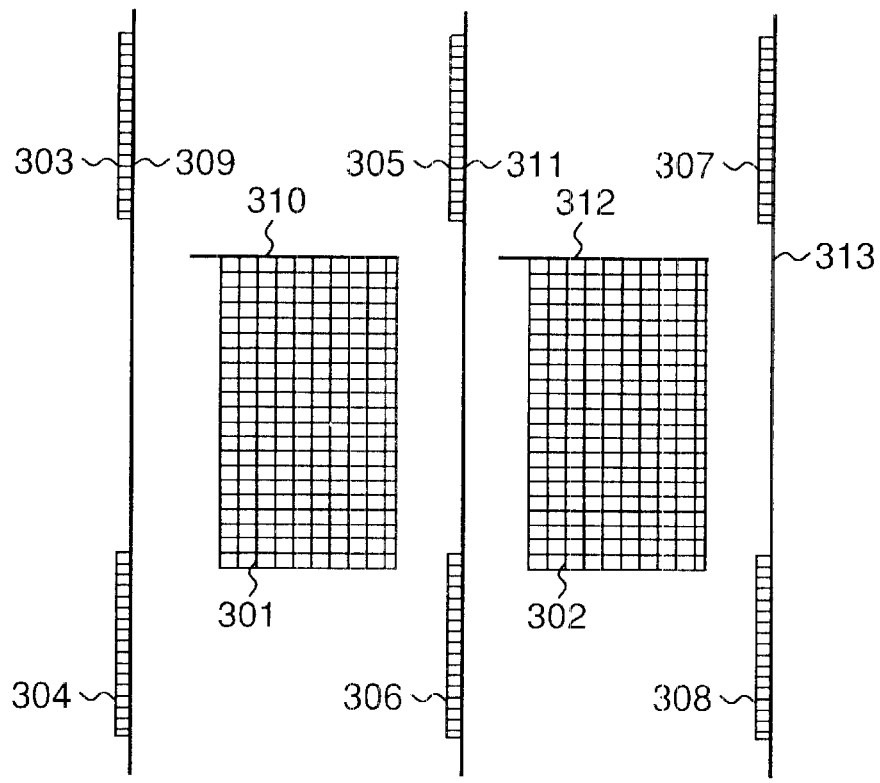
FIGS. 15A through 15D are schematic views of a charge storage type sensor.

FIGS. 15A through 15D show another sensing example to be used for focus detection. In FIG. 15A, the charge storage type sensor has a CMOS type construction having three pairs of line sensors and one pair of area sensors. One pair of area sensor sections 301 and 302 executes horizontal phase difference detection. The three pairs of line sensors 303, 304; 305, 306; 307 and 308 execute vertical phase difference detection.

Sensor outputs are read from the lines 310 and 312 of the area sensor and from the lines 309, 311 and 313 of the line sensor. The luminance monitoring function is independently owned by each line sensor. With regard to only the luminance monitoring function of the center line sensor, control of the area sensor section is concurrently executed. The number of line sensors can be further increased. The line sensors can also be arranged linearly in the horizontal direction above and below the area instead of the vertical arrangement.

Figure 15B:
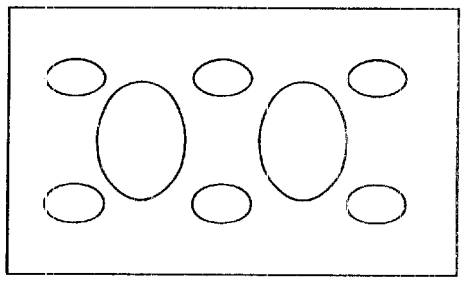
Figure 15C:
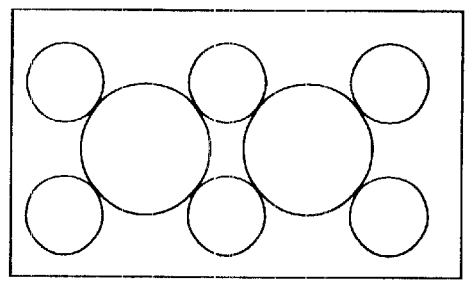

Diaphragm masks corresponding to this sensor are arranged as shown in FIG. 15B. Image-forming lenses are arranged as shown in FIG. 15C. Three pairs of diaphragms and lenses amounting to six in number are provided for the vertical line sensor, while a pair of diaphragms and lenses amounting to two in number are provided for the area use.

Figure 15D:
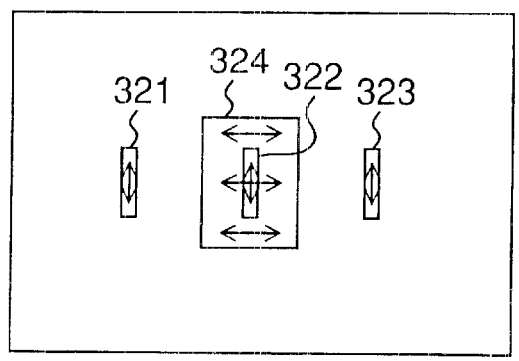

FIG. 15D shows the sensing areas viewed through the finder of the camera when the sensor of FIG. 15A is employed. The reference numerals 321, 322 and 323 denote the sensing sensitivity regions of a vertical phase difference detection use line sensor, and the regions detect the subject having a contrast in the arrow directions. The reference numeral 324 denotes the sensing sensitivity region of a horizontal phase difference detection use area sensor, and the region detects the focus of the subject having a contrast in the arrow direction.

Figure 16:
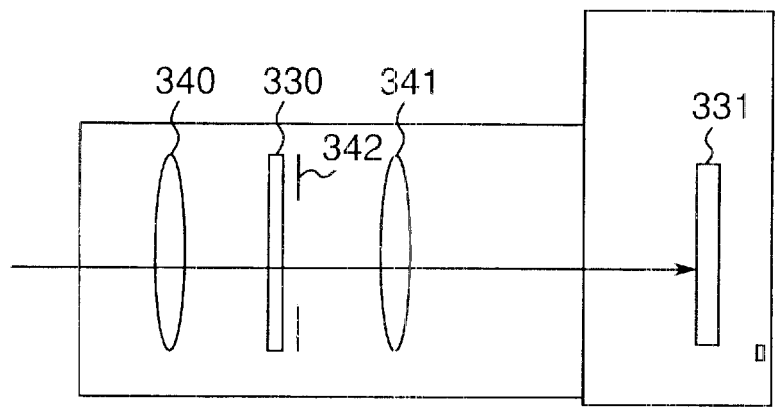
FIG. 16 is a schematic view of a modification example of FIG. 15.

FIG. 16 shows another construction employing the transmission type optical path deflection unit. This is the construction of the so-called digital camera.

The reference numeral 331 denotes an imaging area sensor, while the reference numerals 340 and 341 denote lenses that constitute the imaging lens. The reference numeral 342 denotes a diaphragm. A transmission type optical path deflection unit 330 is arranged beside this diaphragm 342. This device is used for displacing the focal position when executing the focus detection for determining that the focus is obtained when the contrast is high by the image sensor 331. By vibrating the focal position at high speed to sense the direction of focus. The lens position of the high contrast has conventionally been searched by moving the lens. However, the lens is not required to be moved if this system is used, and therefore, the speed is increased.

Besides this method of use, the device can be used directly for focusing. The device may be arranged in any place so long as no influence is exerted on the imaging performance even when the defocusing is executed.

Figure 17A:
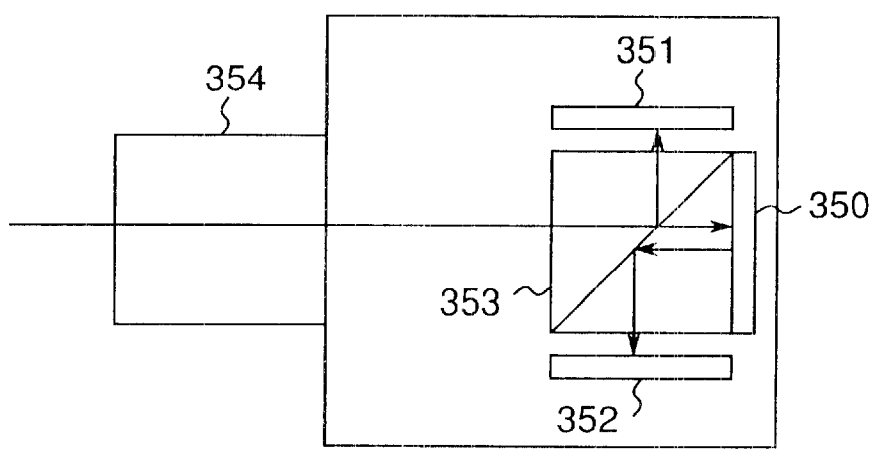
FIGS. 17A and 17B are schematic views of a digital camera employing the reflection type optical path deflection unit according to an embodiment of the present invention.
Figure 17B:
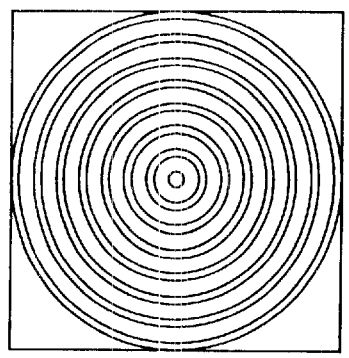
Figure 18:
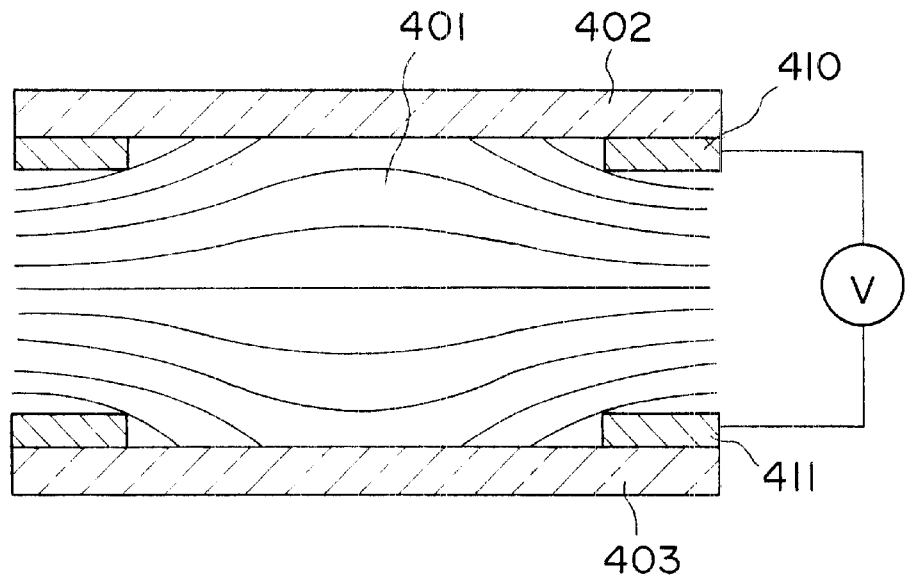
FIG. 18 is an enlarged sectional view of a liquid crystal cell employing nematic liquid crystals according to prior art.
Figure 19:
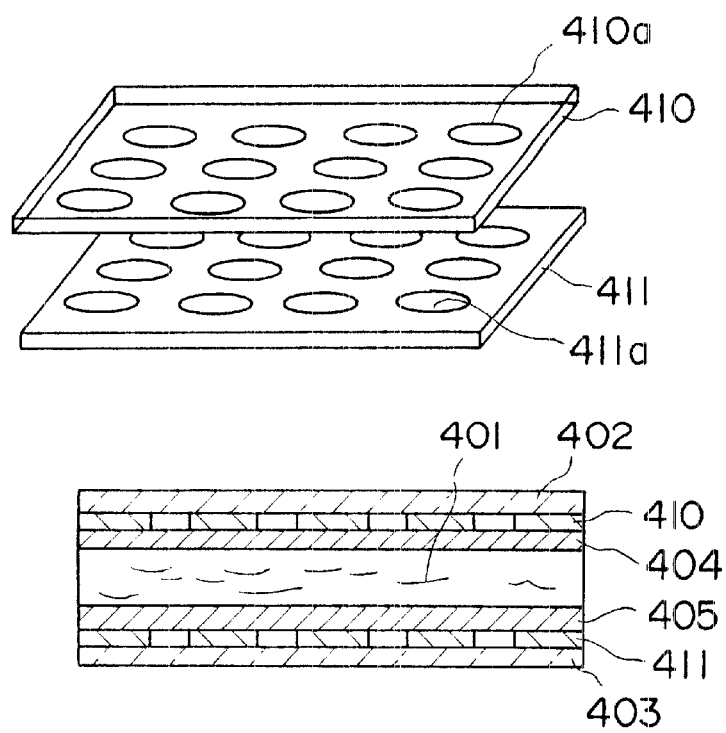
FIG. 19 is an overall schematic view of the cell of FIG. 18 according to prior art.

FIGS. 17A and 17B show another structure for using the reflection type optical path deflection unit. FIG. 17A shows the structure of the so-called digital camera. Luminous flux coming from the imaging lens 354 is reflected on a semi-transparent prism 353 and incident on an imaging area sensor 351. On the other hand, the luminous flux that has passed through the semitransparent prism 353 is reflected on a reflection type optical path deflection unit 350 and incident on an area sensor 352 again through the semitransparent prism 353. The area sensor 352 is provided for focus detection. The size of the area sensor 352 is equal to or smaller than that of the image sensor 351. The focal position of the area sensor 352 can be displaced by the reflection type optical path deflection unit 350. This is AF sensing for providing an arrangement defocused in the optical axis direction of the imaging lens and estimating the focal position by a contrast output. The contrast is obtained to detect which is higher, and the focus lens is moved toward the higher contrast to obtain a focus.

In this stage, no output difference occurs when the defocus amount is large. In this case, the direction in which the focus of the imaging lens exists is found by increasing the focal position displacement quantity by the reflection type optical path deflection unit 350. The direction in which the focal position is displaced is set so that the focal position can be displaced toward either the front focus side or the rear focus side. If the focus lens is moved near the focal position, the focal position displacement quantity of the reflection type optical path deflection unit 350 is reduced for the purpose of improving the accuracy.

If the area sensor 352 is designed to have a size equal to that of the imaging area sensor 351, then the area sensors 351 and 352 obtain focused images if the focal position displacement quantity of the reflection type optical path deflection unit 350 is set to zero. This is equivalent to the multi-plate image sensor. A high resolution can be obtained. A digital camera satisfying both high-speed focus detection and high accuracy can be obtained.

FIG. 17B shows area sensors arranged in the reflection type optical path deflection unit 350. In this case, the optical path is perpendicularly incident and perpendicularly reflected, and therefore, the deflection cells for deflecting the optical path are arranged in a concentric circular shape.

Figure 20A:
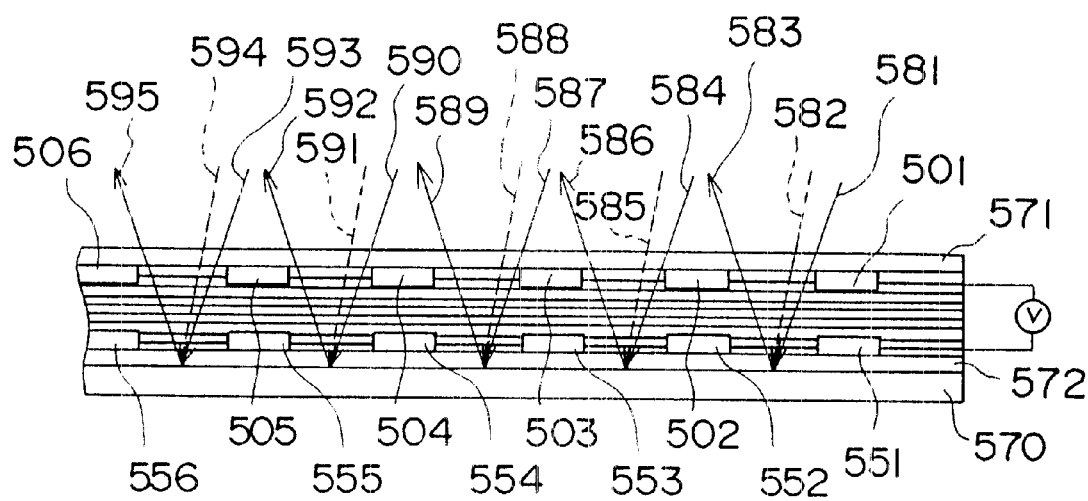
FIGS. 20A and 20B are a sectional view and a plan view of a variable focal position spatial modulation unit according to an embodiment of the present invention.
Figure 20B:
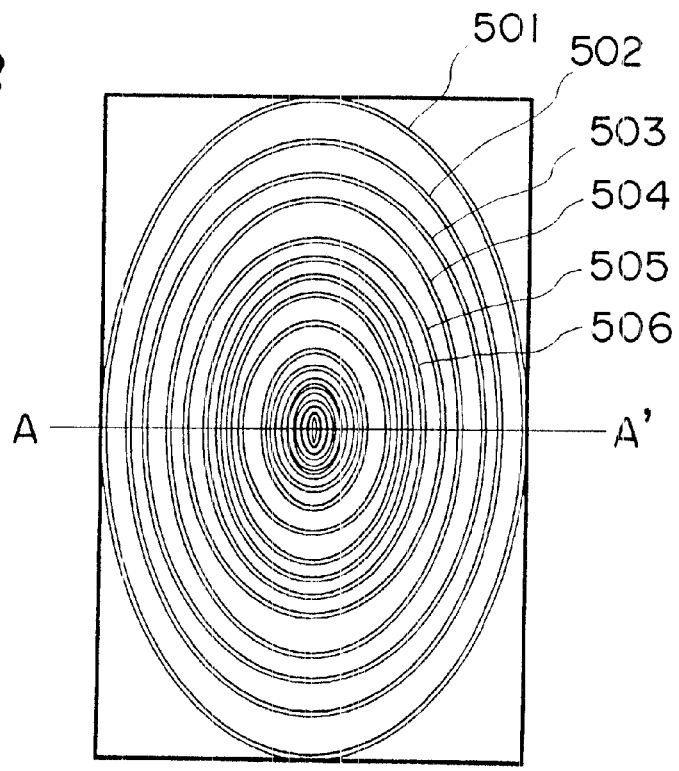

FIGS. 20A and 20B show a variable focal position spatial modulation unit according to an embodiment of the present invention. FIG. 20A is a sectional view, while FIG. 20B is a top view. The reference numerals 571 and 572 denote glass substrates, while the reference numeral 570 denotes a reflection plate constituting a reflection type optical path deflection unit. Electrodes 501, 551; 502, 552; 503, 553; . . . are arranged in a concentric oval shape, and the liquid crystal cells are arranged in a concentric oval ring shape.

A voltage is applied across the electrodes 501 and 551 arranged in a concentric oval ring shape. The voltage is sequentially applied across the electrodes 502 and 552, electrodes 503 and 553, . . . The potentials applied to the electrodes are varied so that a potential difference between adjacent electrodes is small in the center portion and the potential difference increases toward the periphery, or the electrode 501. That is, light is deflected more in the peripheral portion, totally providing a convex lens effect (or concave mirror effect).

Then, by varying the voltages applied across the concentric oval ring-shaped electrodes 501, 502, 503, and the electrodes 551, 552, 553, . . . , the optical path is deflected. Light coming from a path 581 of FIG. 20A is normally reflected in a direction 583. However, in the voltage application state, light coming from a direction 582 is deflected so as to be reflected in the direction 583. Likewise, despite that an incident light 584 is naturally reflected in a direction 586, incident light 585 is deflected in the direction 586. The deflection of light is similarly performed so that light rays 587, 590 and 593 are deflected in directions 588, 591 and 594, respectively. The unit of FIGS. 20A and 20B is utilized for the sub-mirror 103 of FIG. 1 or the like.

Figure 21A:
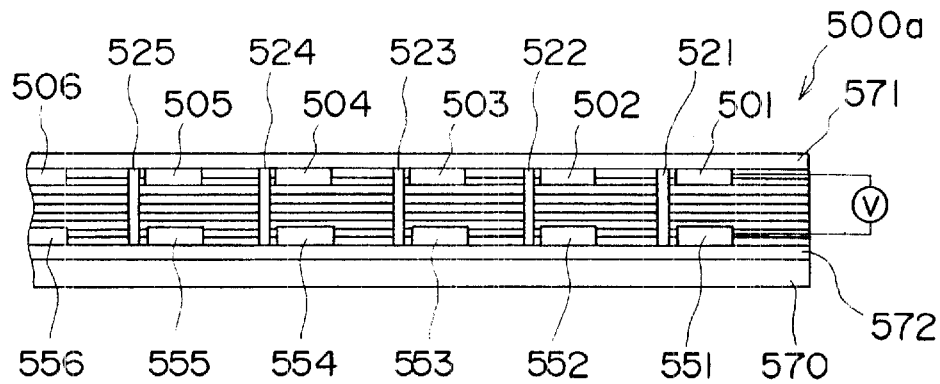
FIGS. 21A through 21C are schematic views of liquid crystal cells having another structure according to an embodiment of the present invention.
Figure 21B:
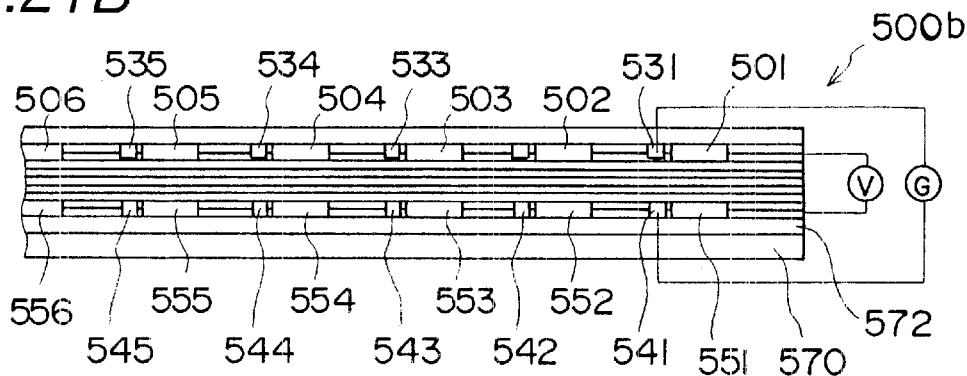
Figure 21C:
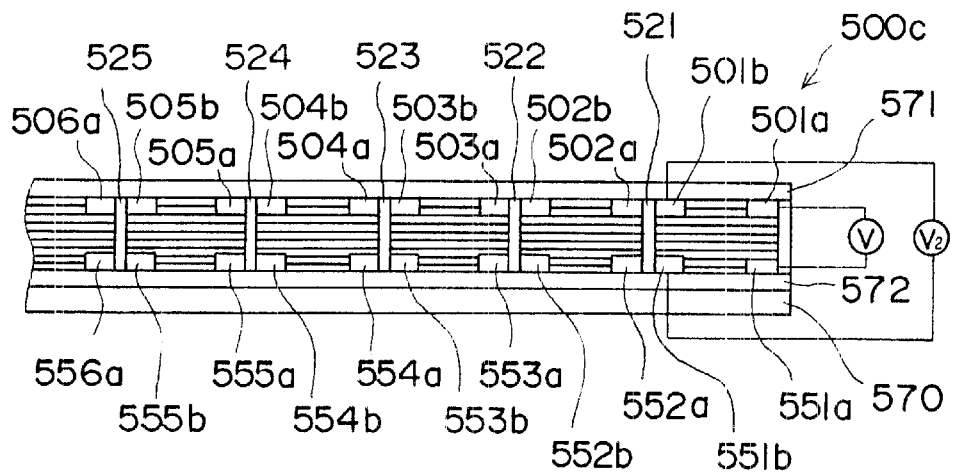

FIGS. 21A through 21C show another liquid crystal cell structure.

In FIG. 21A, liquid crystal cells are precisely partitioned into the respective rings by walls 521, 522, 523, . . . By virtue of the partitioning with the walls 521, 522, 523, . . . for preventing the influence of the adjacent cell electrodes, the refraction force can be set high. It is to be noted that the walls are effective in the case where the incident angle to the liquid crystal cell is close to zero, meaning that the walls 521, 522, 523, . . . for partitioning use interrupt the optical path when angled, exerting a bad influence.

In FIG. 21B, ground electrodes 531, 541; 532, 542; 533, 543; . . . are provided in the vicinity of the electrodes 501, 551; 502, 552; 503, 553; . . . in order to set high the refraction force of each cell. This has an effect for eliminating the influence of adjacent cells. By virtue of control from the ground, the range of control of the potential difference can be surely set wide.

In FIG. 21C, the walls 521, 522, 523, . . . for precisely partitioning the cells are provided and each cell is constructed of two pairs of electrodes 501a, 551a, 501b, 551b; 502a, 552a and 502b, 552b; 503a, 553a, 503b, 553b; voltages V and V2 are applied to the outer portion and the inner portion of the ring-like shape and perform fine control of the electric field distribution, enabling the widening of the effective region of optical path deflection.

Top views of FIGS. 21A through 21C each have a distribution as shown in FIG. 20B. However, needless to say, it is sometimes the case where wiring is provided in a concentric circular shape as shown in FIG. 17B depending on the method of use.

Figure 26A:
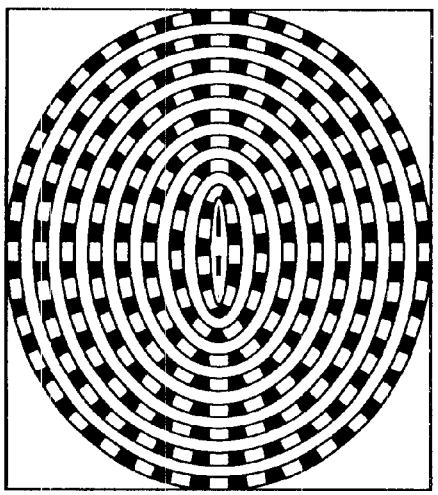
FIGS. 26A through 26D are explanatory views of deflection cell arrangements according to an embodiment of the present invention.
Figure 26B:
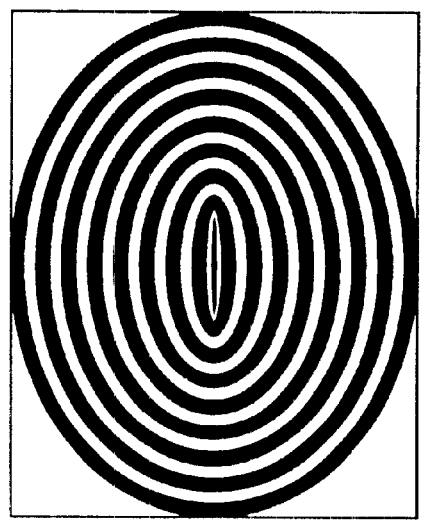
Figure 26C:
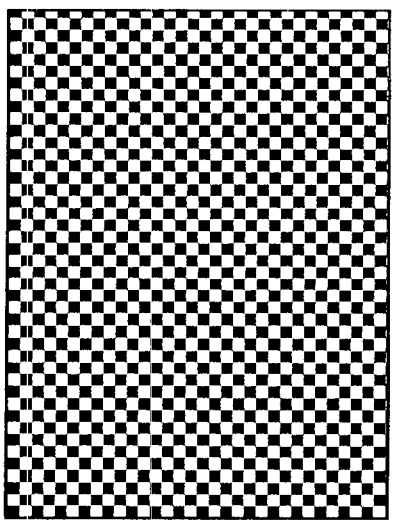
Figure 26D:
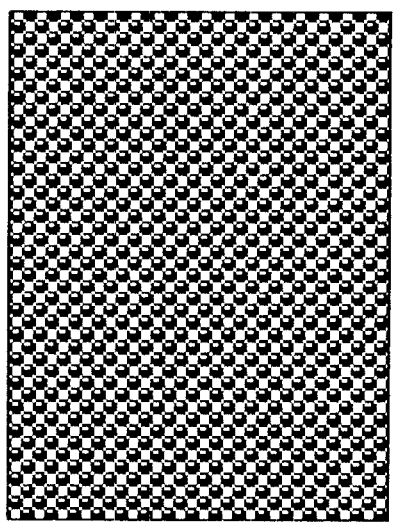

Another embodiment is shown in FIG. 26D. This is an arrangement of liquid crystal microlenses. The arrangement is not the concentric oval arrangement but a rectangular arrangement, in which the same effect is obtained by making the distribution of the application voltage to the liquid crystal microlenses have a concentric oval shape as shown in FIG. 20B.

Next, an example in which a digital micro-mirror device or a micro diffraction element is employed as a deflection unit in place of the liquid crystal cell is shown.

Figure 22:
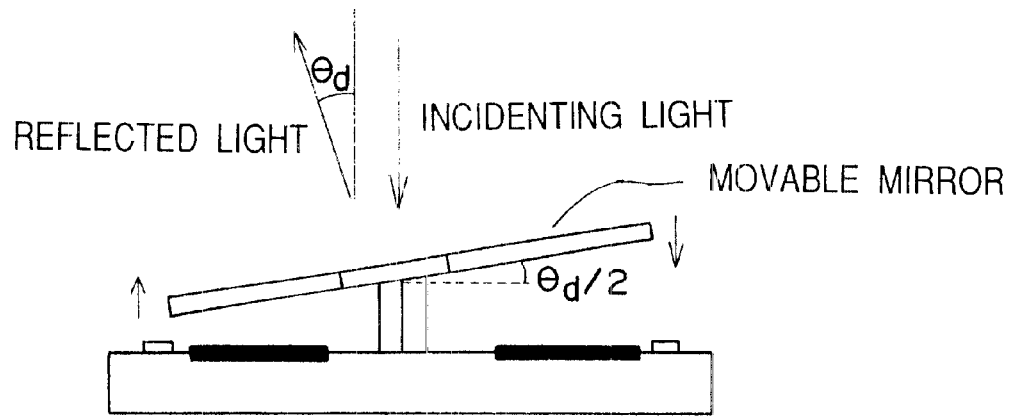
FIG. 22 is a perspective view of the essential part of a reflection type optical path deflection unit employing a digital micro-mirror device.
Figure 25:
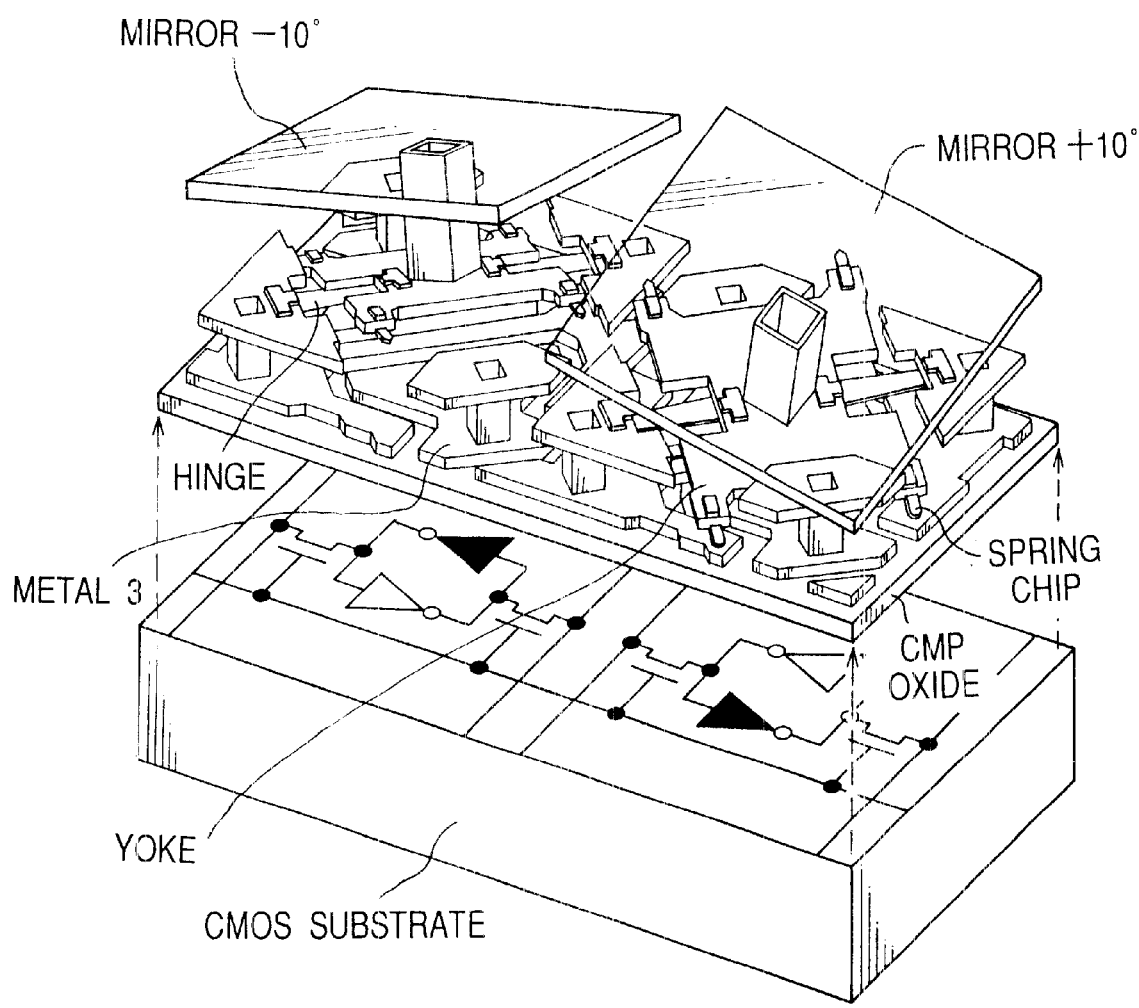
FIG. 25 is a perspective view of the essential part of the digital micro-mirror device.

FIG. 22 shows a cell in which a digital micro-mirror device is used as a reflection cell when constituting a reflection type optical path deflection unit. The reflection angle is varied by inclining a movable mirror depending on the presence or absence of a drive voltage. In order to deflect a reflection angle $\theta_d$, the mirror is required to be moved by $\theta_d/2$. FIG. 25 shows the detailed structure. Each cell has a size of 16 $\mu$m square, and such cells are arranged in a square at intervals of 1 $\mu$m. Each mirror is supported by a center post, and the post is mounted on a substrate called the yoke. A memory element (SRAM having a CMOS structure) provided for each cell moves the yoke by an electrostatic field effect. The yoke can be moved within an angle of ±10° according to a signal to the memory until the yoke comes in contact with the substrate. A rotating time is 10 $\mu$s.

Conventionally, as a reflection device for an LCD projector, a unit in which cells are arranged in a rectangular shape of 1280×1024 has been produced. According to an embodiment of the present invention, the cells are arranged in a concentric oval shape as shown in FIG. 26A in order to control each cell angle and utilize the cells as a concave mirror (for focal position change) capable of being deflected. With this arrangement, an optical path deflection unit having an excellent image forming performance can be provided. A rectangular arrangement as shown in FIG. 26C can be provided if the pupil pass position of the imaging lens 101 of FIG. 1 is merely moved parallel without expecting the function as a concave mirror (for focal position change).

Figure 23:
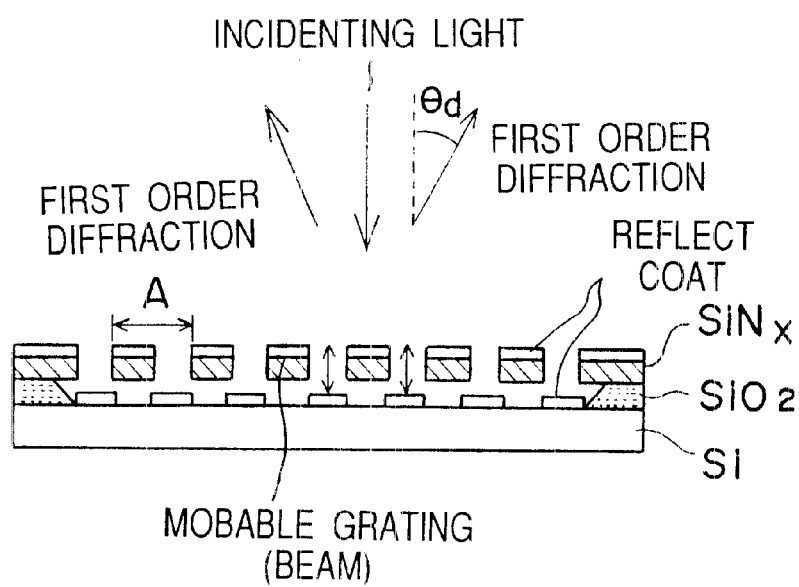
FIG. 23 is an explanatory view of micro diffraction.

FIG. 23 shows a cell in the case where a micro diffraction element is used as a reflection cell when constructing a reflection type optical path deflection unit. This deflects light by taking advantage of a reflex diffraction phenomenon. Assuming that a deflection angle is $\theta$, a diffraction grating cycle is A and a wavelength is $\lambda$, then there holds $\sin\theta = \lambda/A$. Therefore, the deflection angle is determined depending only on the diffraction grating cycle and the wavelength, while the change of the deflection angle is determined depending only on whether the voltage is turned on or off.

Figure 24B:
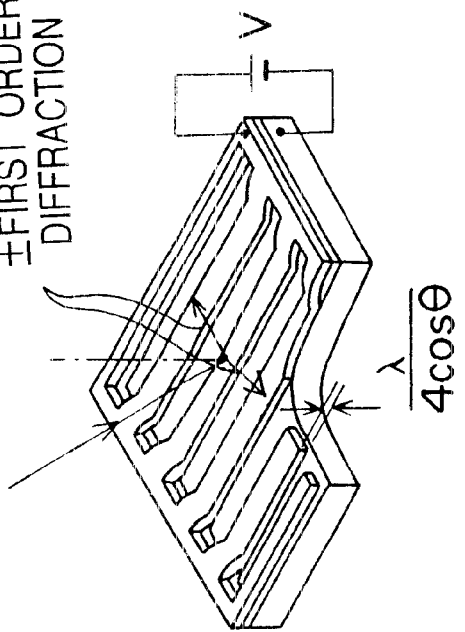
FIGS. 24A and 24B are explanatory views of micro diffraction.
Figure 24A:
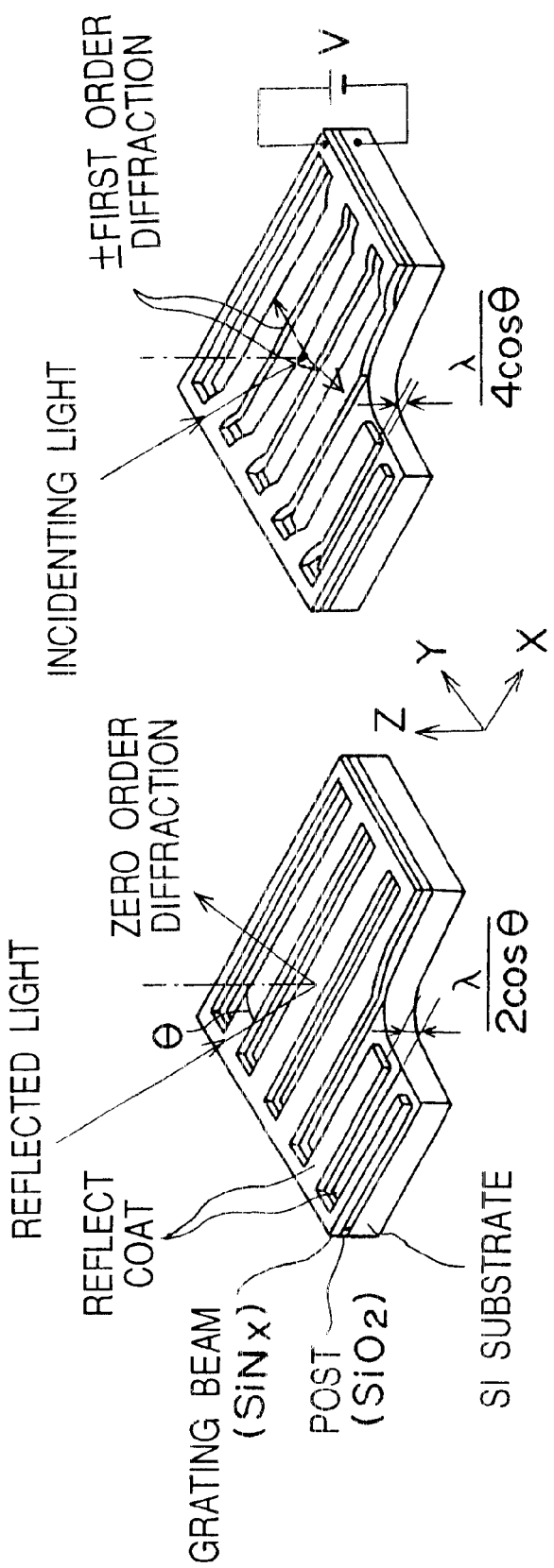

FIG. 23 and FIGS. 24A and 24B show the operation of the micro diffraction element. In the element, a plurality of grating beams (diffraction grating beams) supported by posts are arranged on a silicon substrate, and a gold reflection coat is provided on the grating beams and the surface between the beams. If the voltage is not applied, then the reflected light is comprised of the total reflection of the zero-order diffraction light since the phase difference of the reflected light rays between the grating beam and the space between the beams becomes $2\pi$. If the voltage is applied, then the beam is elastically deformed by the electrostatic force and attracted to the substrate. Then, a half-wavelength displacement phase difference between the grating beam and the space between the beams becomes $\pi$, as a consequence of which the zero-order diffraction light disappears and a ± first-order diffraction light is generated. This diffraction light is utilized for the deflection of the luminous flux. The deflection angle is determined by the wavelength $\lambda$ to be used for the diffraction grating cycle A and sensing.

FIG. 26B shows the arrangement of this micro diffraction element. The diffraction grating is arranged in a concentric oval shape. This may be formed into a concentric circular shape depending on the method of use. According to an embodiment of the present invention, in order to control the angle of each cell and utilize the same as a concave mirror (for focal position change) capable of being deflected, the diffraction grating section is arranged in a concentric oval shape as shown in FIG. 26B. A great deflection angle is obtained by reducing the diffraction grating cycle. That is, in order to provide a concave mirror effect, the cycle in the peripheral portion is made small and the cycle is increased toward the center, according to the design. By providing this arrangement and frequency distribution, an optical path deflection unit having an image forming capability can be provided.

Although the concentric oval arrangement includes only nine lines in the figure, this is ascribed to the schematic illustration. Originally, the cell size is small and the number of lines is designed according to the purpose. By turning on and off the power in a switching manner, the deflection can be effected or not effected in a switching manner.

As described above, the focal position can be changed with a compact construction without any large-scale movable part.

Although the present invention has been fully described in connection with the preferred embodiments thereof with reference to the accompanying drawings, it is to be noted that various changes and modifications are also apparent to those skilled in the art.

As an embodiment of the focus detection device, the deflector may be provided with a plurality of deflection cells arranged in a concentric oval shape or a concentric quasi-oval shape.

The deflection cells are the electrooptic elements that can deflect the optical path of the incident light by an electric signal. The deflector is provided with a plurality of deflection cells and individually electromagnetically controls the deflection cells to execute the deflection of the incident luminous flux. The reason why the plurality of deflection cells are arranged in a concentric oval shape (including a circular shape) or a concentric quasi-oval shape is to uniformly converge the incident luminous flux and obtain a focus.

That is, in general, a luminous flux that travels in a conical shape is incident in the form of an oval shape (including a circular shape) on the deflector placed in the optical path. Therefore, when deflecting the center optical path, there are needed deflection cells arranged in an oval shape (the oval in the narrow sense excluding circle in this case). If the luminous flux passes in a straight line or is reflected onto the same optical path, then the luminous flux center can be prevented from being deflected by arranging the deflection cells in a circular shape.

In a specific case, if the luminous flux traveling in a conical shape is, for example, refracted through a transparent parallel plate arranged aslant relative to the optical axis and thereafter incident on the deflector arranged non-parallel to the transparent parallel plate, then the luminous flux is incident on the deflector in a quasi-oval shape (being not the strict oval but a slightly deformed oval).

Figure 27:
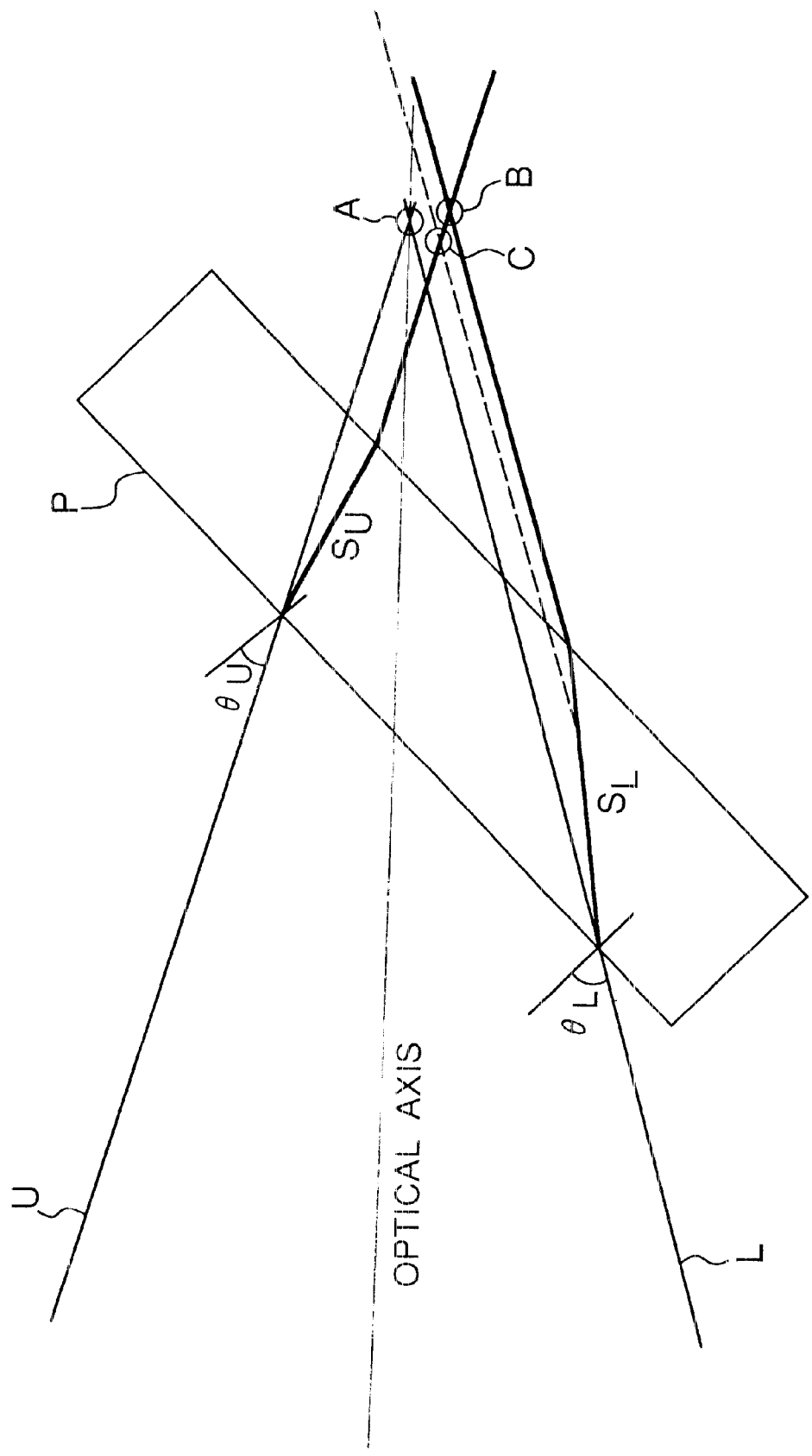
FIG. 27 is an explanatory view of a quasi-oval shape.

That is, as shown in FIG. 27, incident light rays U and L from the lens are focused on a point A if a transparent parallel plate P does not exist. However, if the transparent parallel plate P exists, then the incident light rays are focused on a point B by refraction. The light rays U and L, whose angles $\theta_U$ and $\theta_L$ incident on the parallel plate P are different, have different travel distances $S_U$ and $S_L$ through the parallel plate P, meaning that $S_U<S_L$. Therefore, the focal point is shifted to a point B from a point C at which the focal point would be obtained if $S_U=S_L$. That is, in FIG. 27, the focal point is located at a farther point toward the downside.

Figure 28B:
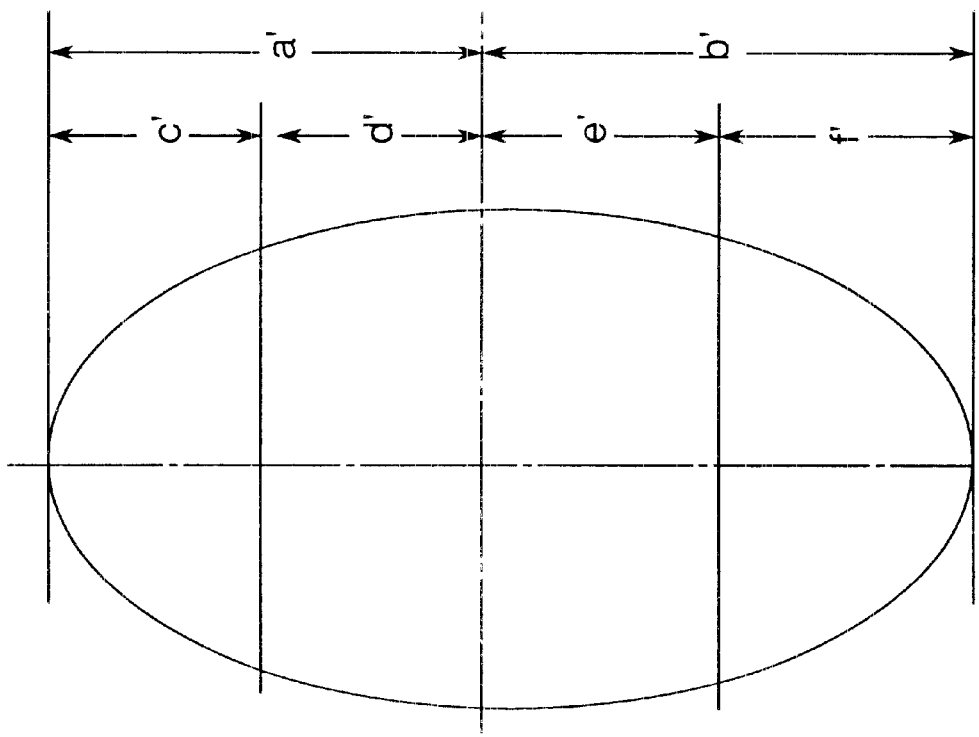
FIGS. 28A and 28B are explanatory views of quasi-oval shapes.
Figure 28A:
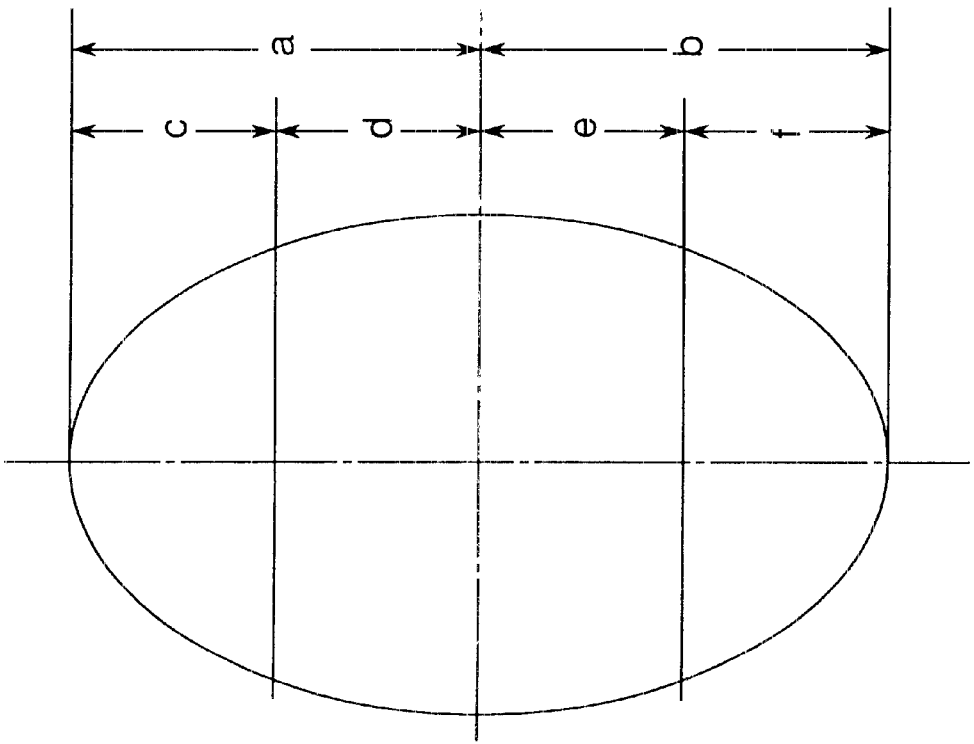

This is schematically shown in FIGS. 28A and 28B. That is, a luminous flux that would have an oval as shown in FIG. 28A when the parallel plate P does not exist is distorted by refraction into a quasi-oval shape as shown in FIG. 28B. For example, with regard to distances between corresponding points, the relations: a=b and c=d=e=f in FIG. 28A comes to have the relations: a'<b' and c'<d'<e'<f' in FIG. 28B.

The reason why the deflection cells are concentrically arranged is to keep the luminous flux center.

If the incident luminous flux is transmitted through the deflection cells, then a great deflection power can be obtained by handling the deflector as a sort of Fresnel lens. If the incident luminous flux is reflected on the deflection cells, a great deflection power can be obtained by handling the deflector as a sort of concave mirror.

In the above-mentioned construction, the focal position can be varied by controlling the deflection cells. For the reason that no large-scale moving part exists, a compact device can be provided.

As an embodiment, the deflection cell may be any one of a liquid crystal cell, a micro diffraction grating and a digital micro-mirror device.

In the case that the deflection cell is the liquid crystal cell, the micro-prism assembly of the liquid crystal cells may be arranged as if it included concentric ovals or annular cells as a whole. With this arrangement, by handling the whole body as a sort of Fresnel lens, a great deflection power can be obtained. Furthermore, the luminous flux position can be changed by a liquid crystal lens with an electric change of a small energy, and by virtue of a small power load, a compact device can be provided.

In the case that the deflection cell is a micro diffraction grating, the optical path can be deflected by utilizing diffraction instead of light refraction. If a peculiar deflection angle is necessary due to the problem of unit arrangement dimensions or the like, the optical system can be compacted by utilizing the micro diffraction element. Furthermore, if the micro diffraction element is a type for deflecting the direction of diffraction by utilizing electrostatics, then the luminous flux position can be changed by the electric change of a small energy, and by virtue of a small power load, a compact device can be provided.

In the case that the deflector is the digital micro-mirror device, which employs the mirror, high brightness and high aperture efficiency can be achieved. Therefore, the quality of an image utilizing the deflected light is good. Furthermore, the luminous flux position can be arbitrarily changed by the electric change of a small energy, and therefore, a great deflection power can be obtained.

The deflection cells include a reflection type and a transmission type. Even with the deflection cell of the transmission type, a reflection type deflector can be provided.

As an embodiment, each of the deflection cells of the deflector is the transmission type. The deflector is further provided with a mirror arranged adjacent to the deflection cells oppositely from the incident side.

In the above-mentioned embodiment, the luminous flux incident on the deflection cells is transmitted through the deflection cells, reflected on the mirror, transmitted again through the deflection cells and then emitted. By combining the deflection cells with the mirror, selected parts of the luminous flux can be put into a focus.

By a combination with a concave mirror, a great power can be obtained even if the quantity of change of the deflection by the deflection cells is small. Otherwise, both the convergence change and divergence change of light are not needed, and this allows a design capable of coping with a variety of lenses to be achieved with either one of the changes. Therefore, the construction can be simplified. For example, a voltage to be applied to the deflection cell is not required to be inverted in polarity, and therefore, the circuit construction can be simplified.

According to another structure, there is provided a focus control device comprising: a lens for transmitting subject light; a driver for driving the lens; an image sensor for detecting at least a part of the subject light transmitted by the lens; a spatial modulation unit that is arranged between the lens and the image sensor and is able to electromagnetically vary a focal position; a contrast type of focus detector for detecting a focal position depending on sharpness of an image detected by the image sensor; and a control unit for controlling the spatial modulation unit and the contrast type of focus detector so that the spatial modulation unit can change continuously or in steps the focal position until the contrast type of focus detector detects the focal position and then controlling the driver so as to drive the lens on a basis of the focal position detected by the contrast type of focus detector.

According to the type of focus detection for detecting the focus by contrast, there has conventionally been the process of obtaining the peak position of the output curve of contrast detection by moving the focus lens of the imaging lens so as to obtain a focus in the maximum contrast position. In contrast to this, the focus control device having the aforementioned construction can change the focal position in a shorter time than when actually moving the focus lens by controlling the spatial modulation unit until the focal position is determined. Therefore, the focus control device having the aforementioned construction can control the focus at high speed.

The imaging lens has conventionally been required to be large in size since the focus lens made of glass or plastic has been required to be moved by a considerable amount in the optical axis direction. However, if the focus control device having the aforementioned construction is employed, the imaging lens can be compacted.

It has conventionally been required to replace the lens itself or move one or a plurality of lenses in order to obtain the necessary focal position during the design phase of the generic optical system. However, if the focus control device having the aforementioned construction is employed, the optical system can be simply constructed compact.

According to another structure, there is provided another focus control device comprising: a lens for transmitting subject light; a driver for driving the lens; an image sensor for detecting at least a part of subject light transmitted by the lens; a spatial modulation unit that is arranged between the lens and the image sensor and is able to electromagnetically vary a focal position; a phase difference type of focus detector for detecting a focal position by using an image detected by the image sensor; and a control unit for controlling the spatial modulation unit and the phase difference type of focus detector so that the phase difference type of focus detector can detect the focal position after the spatial modulation unit changes the focal position according to pupil information upon an exit pupil of the lens and then controlling the driver so as to drive the lens on a basis of the focal position detected by the phase difference type of focus detector.

In the above-mentioned focus control device, the spatial modulation unit changes the focal position according to the size, position and so on of the exit pupil of the lens so as to set the luminous flux to be guided to the image sensor in the optimum state. Therefore, sensing can be executed in a wide range regardless of the size, position and so on of the exit pupil of the lens.

According to another structure, there is provided a luminous flux deflection device comprising: a deflector that is arranged between a lens and a detector and deflects luminous flux guided from the lens to the detector while enabling a deflection characteristic of luminous flux guided from the lens to the detector to be changed; and a controller for controlling the deflector according to pupil information upon an exit pupil of the lens and changing the deflection characteristic of luminous flux guided from the lens to the detector.

In the above-mentioned luminous flux deflection device, the luminous flux from the subject passes through the lens and reaches the detector by way of the deflector. The deflector can change the deflection characteristic of the incident luminous flux, for example, so as not to cause pupil shading by the lens, according to the characteristics of the lens on the basis of the pupil information (for example, the pupil diameter, pupil position, pupil shape and so on of the lens). This allows the detector to efficiently function.

According to the above-mentioned construction, the sensing range is increased since the luminous flux can be changed according to the pupil position in contrast to the sensing of which, for example, the shading due to the exit pupil has been disadvantageous. With this arrangement, rapid AF can be achieved even when the serious blur of the sensing occurs as a consequence of the displacement of the focal position relative to the detector. In executing sensing by means of an object lens having a varied pupil diameter, the types of object lenses that can be managed are increased. Besides, by utilizing this mechanism for the focus lens of the imaging lens, the focus can be controlled.

As an embodiment, the aforementioned deflector may be provided with a plurality of deflection cells arranged in a concentric oval shape or a concentric quasi-oval shape.

As an embodiment, each of the deflection cells may be any one of a liquid crystal cell, a micro diffraction grating and a digital micro-mirror device.

As an embodiment, the deflection cell of the deflector may be the transmission type. The deflector may be further provided with a mirror (preferably a concave mirror) arranged adjacent to the deflection cells oppositely from the incident side.

According to another structure, there is provided a spatial modulation unit comprising: a deflector having a plurality of deflection cells arranged in a concentric oval shape or a concentric quasi-oval shape; and a controller for electromagnetically controlling the deflection cells of the deflector so as to change a focal position of luminous flux incident on the deflection cells of the deflector.

The spatial modulation unit is an optical unit that is provided with a plurality of deflection cells and individually electromagnetically controls the deflection cells to deflection the incident luminous flux. As a spatial modulation unit, there has conventionally been proposed a display device that switches display by deflecting the optical path. However, there has not been proposed the spatial modulation unit that obtains a focus as in the aforementioned construction.

In the aforementioned construction, by controlling the deflection cells, the focal position can be changed. There is no large-scale movable portion, and therefore, a compact device can be achieved. The spatial modulation unit having the aforementioned construction can be widely utilized for a variety of detection devices and the like.

As an embodiment, the deflection cells can change the focal position even when the incident light is transmitted or reflected. According to either one of the methods by which the incident light is transmitted or reflected, a spatial modulation unit can be constructed, allowing flexible design suited for the optical system to be achieved.

As an embodiment, each of the aforementioned deflection cells may be any one of a liquid crystal cell, a micro diffraction grating and a digital micro-mirror device.

According to another structure, there is provided a camera comprising: a focus detector; a deflector that is arranged between a lens and the focus detector and deflects luminous flux guided from the lens to the focus detector while enabling a deflection characteristic of luminous flux guided from the lens to the focus detector to be changed; and a controller for controlling the deflector according to pupil information upon an exit pupil of the lens and changing the deflection characteristic of luminous flux guided from the lens to the focus detector.

As an embodiment, the deflector may be provided with a plurality of deflection cells arranged in a concentric oval shape or a concentric quasi-oval shape.

Furthermore, each of the deflection cells may be any one of a liquid crystal cell, a micro diffraction grating and a digital micro-mirror device.

As an embodiment, the deflector may be provided for the sub-mirror of a single-lens reflex camera.

As an embodiment, the deflection cells of the deflector may be of the transmission type. The deflector may be further provided with a mirror (preferably a concave mirror) arranged adjacent to the deflection cells oppositely from the incident side.

What is claimed is:

1. A luminous flux deflection device comprising:
    a deflector that is arranged between a lens and a detector and that deflects luminous flux guided from the lens to the detector, wherein the deflector enables a deflection characteristic of the luminous flux guided from the lens to the detector to be changed; and
    a controller for controlling the deflector on a basis of pupil information upon an exit pupil of the lens and for changing the deflection characteristic of the luminous flux guided from the lens to the detector.

2. The luminous flux deflection device as claimed in claim 1, wherein the deflector is provided with a plurality of deflection cells arranged in one of a concentric oval shape and a concentric quasi-oval shape.

3. The luminous flux deflection device as claimed in claim 2, wherein each of the deflection cells of the deflector is any one of a liquid crystal cell, a micro diffraction grating and a digital micro-mirror device.

4. The luminous flux deflection device as claimed in claim 2, wherein the deflection cells of the deflector are of a transmission type, and
    wherein the deflector is further provided with a mirror which is arranged adjacent to the deflection cells and which is arranged opposite to an incident side of the luminous flux.

5. The luminous flux deflection device as claimed in claim 4, wherein the mirror of the deflector has a concave surface.

6. A focus detection device comprising:
    a focus detector;
    a deflector that is arranged between a lens and the focus detector and that deflects luminous flux guided from the lens to the focus detector, wherein the deflector enables a deflection characteristic of the luminous flux guided from the lens to the focus detector to be changed; and
    a controller for controlling the deflector on a basis of pupil information upon an exit pupil of the lens and for changing the deflection characteristic of the luminous flux guided from the lens to the focus detector.

7. The focus detection device as claimed in claim 6, wherein the deflector is provided with a plurality of deflection cells arranged in one of a concentric oval shape and a concentric quasi-oval shape.

8. The focus detection device as claimed in claim 7, wherein each of the deflection cells of the deflector is any one of a liquid crystal cell, a micro diffraction grating and a digital micro-mirror device.

9. The focus detection device as claimed in claim 7, wherein the deflection cells of the deflector are of a transmission type, and
    wherein the deflector is further provided with a mirror which is arranged adjacent to the deflection cells and which is arranged opposite to an incident side of the luminous flux.

10. The focus detection device as claimed in claim 9, wherein the mirror of the deflector has a concave surface.

11. A camera comprising:
    a focus detector;
    a deflector that is arranged between a lens and the focus detector and that deflects luminous flux guided from the lens to the focus detector, wherein the deflector enables a deflection characteristic of the luminous flux guided from the lens to the focus detector to be changed; and
    a controller for controlling the deflector on a basis of pupil information upon an exit pupil of the lens and for changing the deflection characteristic of the luminous flux guided from the lens to the focus detector.

12. The camera as claimed in claim 11, wherein the deflector is provided with a plurality of deflection cells arranged in one of a concentric oval shape and a concentric quasi-oval shape.

13. The camera as claimed in claim 12, wherein each of the deflection cells of the deflector is any one of a liquid crystal cell, a micro diffraction grating and a digital micro-mirror device.

14. The camera as claimed in claim 11, wherein the deflector is provided for a sub-mirror of a single-lens reflex camera.

15. The camera as claimed in claim 11, wherein the deflection cells of the deflector are of a transmission type, and
wherein the deflector is further provided with a mirror which is arranged adjacent to the deflection cells and which is arranged opposite to an incident side of the luminous flux.

16. The camera as claimed in claim 15, wherein the mirror has a concave surface.

17. A focus control device comprising:
a lens for transmitting subject light;
a driver for driving the lens;
an image sensor for detecting at least a part of the subject light transmitted through the lens;
a spatial modulation unit that is arranged between the lens and the image sensor and that is able to electromagnetically change a focal position;
a contrast type of focus detector for detecting a focal position on a basis of sharpness of an image detected by the image sensor; and
a control unit for controlling the spatial modulation unit and the contrast type of focus detector so that the spatial modulation unit can change the focal position until the contrast type of focus detector detects the focal position and then for controlling the driver so as to drive the lens on a basis of the focal position detected by the contrast type of focus detector, wherein a change by the spatial modulation unit of the focal position is one of a continuous change and a change made step by step.

18. A focus control device comprising:
a lens for transmitting subject light;
a driver for driving the lens;
an image sensor for detecting at least a part of the subject light transmitted through the lens;
a spatial modulation unit that is arranged between the lens and the image sensor and that is able to electromagnetically change a focal position;
a phase difference type of focus detector for detecting a focal position by using an image detected by the image sensor; and
a control unit for controlling the spatial modulation unit and the phase difference type of focus detector so that the phase difference type of focus detector can detect the focal position after the spatial modulation unit changes the focal position on a basis of pupil information upon an exit pupil of the lens and then for controlling the driver so as to drive the lens on a basis of the focal position detected by the phase difference type of focus detector.

19. A variable focal position spatial modulation device comprising:
a variable refraction index material that is arranged inside a luminous flux and that is able to deflect incident light;
a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refraction index material between the pair of electrodes; and
a voltage supplier for supplying a voltage across the electrodes, in which a refractive index distribution of the variable refractive index material changes in accordance with the voltage supplied across the electrodes, so that a focal position is changed;
wherein the variable refractive index material is partitioned into a first region including both a first field in which the pair of electrodes of a first electrode pair of the electrode pairs oppose each other and a second field around the first field, and into a second region, adjacent to the first region, including both a third field in which the pair of electrodes of a second electrode pair of the electrode pairs oppose each other and a fourth field around the third field, thereby reducing the mutual influence that electric fields of the first and second regions exert on each other.

20. The variable focal position spatial modulation device as claimed in claim 19, in which the variable refractive index material is partitioned into the first region and the second region discontinuously to each other.

21. The variable focal position spatial modulation device as claimed in claim 19, in which the variable refractive index material is a liquid crystal.

* * * * *